United States Patent
Hoshizuki et al.

(10) Patent No.: US 12,519,611 B2
(45) Date of Patent: Jan. 6, 2026

(54) ENCRYPTION PROCESSING DEVICE AND ENCRYPTION PROCESSING METHOD

(71) Applicant: AXELL CORPORATION, Tokyo (JP)

(72) Inventors: Yusuke Hoshizuki, Tokyo (JP); Kotaro Matsuoka, Tokyo (JP)

(73) Assignee: AXELL CORPORATION, Tokyo (JP)

( * ) Notice: Subject to any disclaimer, the term of this patent is extended or adjusted under 35 U.S.C. 154(b) by 228 days.

(21) Appl. No.: 18/352,178

(22) Filed: Jul. 13, 2023

(65) Prior Publication Data

US 2024/0048353 A1 Feb. 8, 2024

(30) Foreign Application Priority Data

Jul. 19, 2022 (JP) ................................ 2022-114760

(51) Int. Cl.
| | |
|---|---|
| H04L 9/00 | (2022.01) |
| G06F 17/10 | (2006.01) |
| G06F 21/60 | (2013.01) |
| H04L 9/06 | (2006.01) |

(52) U.S. Cl.
CPC .............. H04L 9/008 (2013.01); G06F 17/10 (2013.01); G06F 21/602 (2013.01); H04L 9/0618 (2013.01)

(58) Field of Classification Search
CPC ....... H04L 9/008; H04L 9/0618; G06F 17/10; G06F 21/602
See application file for complete search history.

(56) References Cited

U.S. PATENT DOCUMENTS

| | | | | |
|---|---|---|---|---|
| 11,115,183 | B2* | 9/2021 | Cheon | H04L 9/304 |
| 2010/0329454 | A1* | 12/2010 | Takashima | H04L 9/3073 |
| | | | | 380/28 |
| 2018/0359079 | A1* | 12/2018 | Hu | H04L 9/008 |
| 2019/0334694 | A1* | 10/2019 | Chen | H04L 9/0631 |

OTHER PUBLICATIONS

Chillotti, I. et al., "TFHE: Fast Fully Homomorphic Encryption over the Torus*," *Journal of Cryptology*, 33:34-91, 2020, 62 pages.
Okada, H. et al., "Integerwise Functional Bootstrapping on TFHE," 2020, 19 pages.
Chillotti, I. et al., "Improved Programmable Bootstrapping with Larger Precision and Efficient Arithmetic Circuits for TFHE," Nov. 2021, 63 pages.

* cited by examiner

*Primary Examiner* — Ayoub Alata
(74) *Attorney, Agent, or Firm* — MASUVALLEY & PARTNERS; Peter Martinez

(57) ABSTRACT

An encryption processing device processing a ciphertext is disclosed. The ciphertext is a fully homomorphic ciphertext that has a value obtained by adding an error with a predetermined variance to a predetermined value, as a plaintext associated with an integer and that enables a predetermined operation between integers without decryption, and the predetermined operation is division of a first ciphertext as a dividend and a second ciphertext as a divisor. The encryption processing device includes a processor which executes a process including calculating a third ciphertext corresponding to a reciprocal of the divisor by using a first polynomial for the second ciphertext, and performing multiplication based on the first ciphertext and the third ciphertext to calculate a fourth ciphertext corresponding to a result of division of the first ciphertext and the second ciphertext as a result of multiplication.

11 Claims, 16 Drawing Sheets

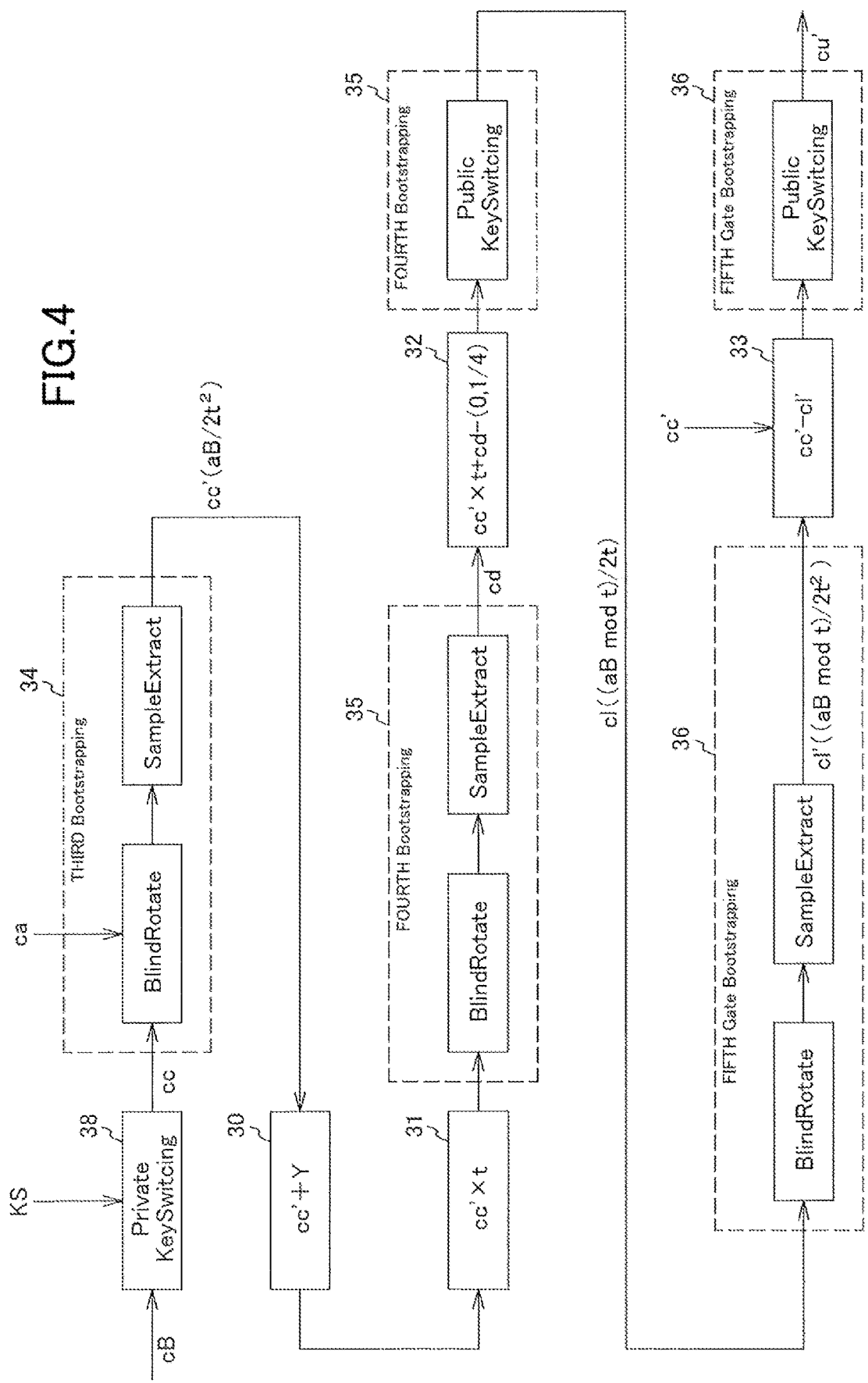

ENCRYPTION PROCESSING DEVICE AND ENCRYPTION PROCESSING METHOD

RELATED APPLICATIONS

This application is based upon and claims the benefit of priority to Japanese Patent Application No. 2022-114760, filed on Jul. 19, 2022, with the Japanese Patent Office, the entire contents of which are incorporated herein by reference in their entirety.

FIELD OF THE INVENTION

The embodiments discussed herein are related to an encryption processing device that processes a cyphertext and an encryption processing method.

BACKGROUND OF THE INVENTION

Homomorphic encryption is an encryption technique that can process encrypted data without decrypting the encrypted data.

Encryption that allows an operation between ciphertexts, corresponding to addition of plaintexts, to be performed is additive homomorphic encryption, and encryption that allows an operation between ciphertexts, corresponding to multiplication of plaintexts, to be performed is multiplicative homomorphic encryption.

There are conventionally known additive homomorphic encryption that performs only an additive operation (addition and subtraction) while a finite cyclic group is regarded as an integer and multiplicative homomorphic encryption that performs only a multiplicative operation (multiplication) while a finite cyclic group is regarded as an integer.

For the finite cyclic group, an integral multiple can be obtained by repeating addition, and therefore an integral multiple by a plaintext can be calculated. Also, exponentiation by a plaintext can be calculated by repeating multiplication.

There are also known fully homomorphic encryption (FHE) that processes both an additive operation and a multiplicative operation while ciphertexts remain encrypted.

One of known fully homomorphic encryption techniques is fully homomorphic encryption based on the LWE (Learning with Errors) problem, which is configured by adding a small error to a plaintext in an encryption process to such an extent that there is no problem in decryption.

In the fully homomorphic encryption based on the LWE problem, an error is accumulated as an operation is repeated, and therefore, bootstrapping for reducing an error component while the error component remains encrypted is performed before the error becomes too large to allow decryption.

The computation time of bootstrapping occupies most of the computation time included in fully homomorphic encryption. Further, the amount of computation is large in bootstrapping, because bootstrapping handles a large amount of data. Therefore, in an operation of fully homomorphic encryption, the operation result may not be able to be obtained within a practical time.

A scheme that drastically improves this problem is TFHE (Fast Fully Homomorphic Encryption over the Torus) described in TFHE: Fast Fully Homomorphic Encryption over the Torus. Journal of Cryptology, 33:34-91, 2020, I. Chillotti, N. Gama, M. Georgieva, and M. Izabachene (referred to as "aforementioned paper" in the following descriptions).

Homomorphic encryption includes Bit-wise type homomorphic encryption having two values as a plaintext and based on a logical operation, and Integer-wise type homomorphic encryption having a whole integer as a plaintext as one ciphertext. TFHE described in Non-Patent Literature 1 is the Bit-wise type.

The plaintext in TFHE is a real number from 0 to 1 associated with a circle group. Therefore, by associating sections obtained by dividing the range from 0 to 1 of the circle group with integers in turn, TFHE can be applied as Integer-wise type homomorphic encryption having an integer as the plaintext (for example, Integerwise Functional Boostrapping on TFHE, 2020, Hiroki Okada, Shinsaku Kiyomoto, and Carlos Cid).

If TFHE can be used as homomorphic encryption that enables four arithmetic operations to be performed in an Integer-wise manner, more efficient processing can be performed as compared with bit-by-bit computation.

A TLWE ciphertext used in TFHE is shown by the aforementioned paper as being an additive homomorphic type for a plaintext on a circle group, and it is obvious that addition (subtraction) can be performed.

As for division, there have been proposed a method of performing division between ciphertexts by using a technique of evaluating any two-variable function, and a method of performing division between ciphertexts by evaluating a lookup table by a method called Tree PBS (For example, Hiroki and Improved Programmable Boostrapping with Larger Precision and Efficient Arithmetic Circuits for TFHE, 2021, I. Chillotti, D. Ligier, J. B. Orfila, and S. Tap).

In the method disclosed by Hiroki et al., BlindRotate needs to be performed, the number of times of BlindRotate being equal to the square of the number of types of plaintexts included in one ciphertext. Thus, there is a problem that calculation takes time due to a large amount of calculation. Although the method disclosed by Chillotti et al. can calculate division at a relatively high speed, it is necessary to further increase the speed.

SUMMARY OF THE INVENTION

According to an aspect of the embodiments, an encryption processing device processes a ciphertext, the ciphertext being a fully homomorphic ciphertext that has a value obtained by adding an error with a predetermined variance to a predetermined value, as a plaintext associated with an integer and that enables a predetermined operation between integers without decryption, and the predetermined operation being division of a first ciphertext as a dividend and a second ciphertext as a divisor. The encryption processing device comprises a processor which executes the following processes. That is, calculating a third ciphertext corresponding to a reciprocal of the divisor by using a first polynomial for the second ciphertext, and performing multiplication based on the first ciphertext and the third ciphertext to calculate a fourth ciphertext corresponding to a result of division of the first ciphertext and the second ciphertext as a result of multiplication.

The objects and advantages of the invention will be realized and achieved by the elements and combinations specifically pointed out in the claims.

It is to be understood that both the foregoing general description and the following detailed description are exemplary and illustrative and are not intended to limit the invention as claimed.

BRIEF DESCRIPTION OF DRAWINGS

FIG. 4 is a more detailed explanatory diagram of an operation process of multiplication based on the functional configuration in FIG. 2;

DESCRIPTION OF EMBODIMENTS

Embodiments of the present invention are described below in detail with reference to the drawings.

In the following descriptions, an alphanumeric character sandwiched by [ ] indicates that it is a vector. An alphanumeric character sandwiched by { } indicates that it is a set.

Further, in the present specification, a "logical operation" refers to a binary or multi-value operation.

Figure 1:
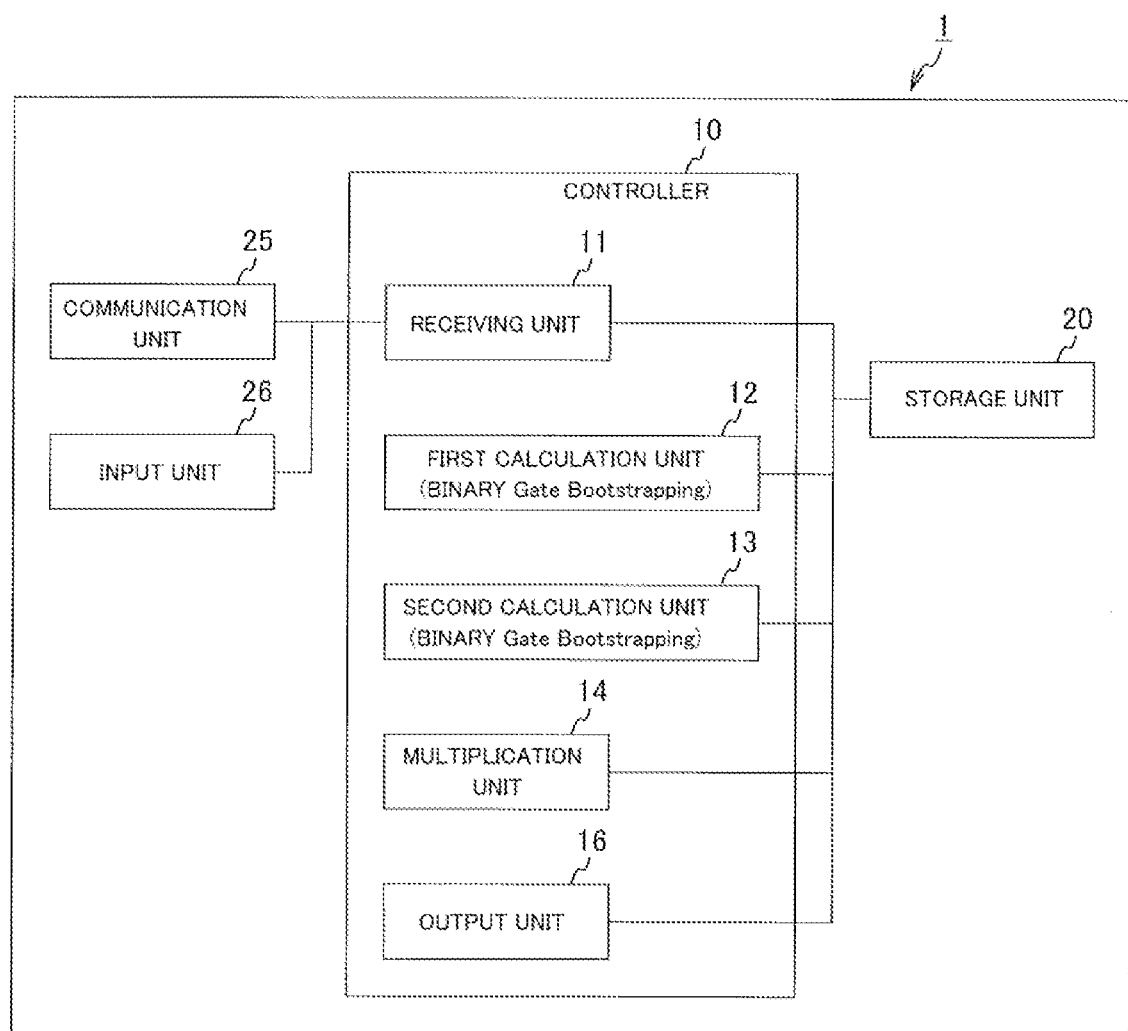
FIG. 1 is an explanatory diagram of a functional configuration of a encryption processing device of the present embodiment.

FIG. 1 is an explanatory diagram of a functional configuration of the encryption processing device of the present embodiment.

An encryption processing device 1 includes a controller 10, a storage unit 20, a communication unit 25, and an input unit 26.

The controller 10 includes a receiving unit 11, a first Bootstrapping unit (a calculation unit) 12, a second Bootstrapping unit (a calculation unit) 13, a multiplication unit 14, and an output unit 16.

The receiving unit 11 receives input of a ciphertext that is an object of an operation, via the communication unit 25 or the input unit 26. Alternatively, the receiving unit 11 receives input of a ciphertext from another process performed by the encryption processing device 1.

The first Bootstrapping unit 12 performs first Gate Bootstrapping for an input ciphertext received by the receiving unit 11.

The second Bootstrapping unit 13 performs second Gate Bootstrapping for the input ciphertext received by the receiving unit 11.

The multiplication unit 14 performs a division operation by multiplying a ciphertext as a multiplicand by a ciphertext as a reciprocal of a divisor.

The output unit 16 outputs a final operation result to outside of the encryption processing device 1 or to another processing process performed in the encryption processing device 1.

The storage unit 20 can store therein an input ciphertext, a temporary file and temporary data used in an operation for ciphertexts, and an output ciphertext.

An encrypted encryption database 60 can also be stored in the storage unit 20.

The communication unit 25 connects the encryption processing device 1 to a network, thereby enabling communication between the encryption processing device 1 and an external device to be performed.

The encryption processing device 1 can serve as a database server by storing the encrypted encryption database 60 in the storage unit 20 and including the communication unit 25.

In this case, the encryption processing device 1 can receive an encrypted query from a terminal device as the external device, search the encrypted encryption database 60, and send an encrypted search result to the terminal device.

The input unit 26 inputs a ciphertext that is an object of arithmetic processing and a query for the encrypted database 60, to the encryption processing device 1.

Figure 2:
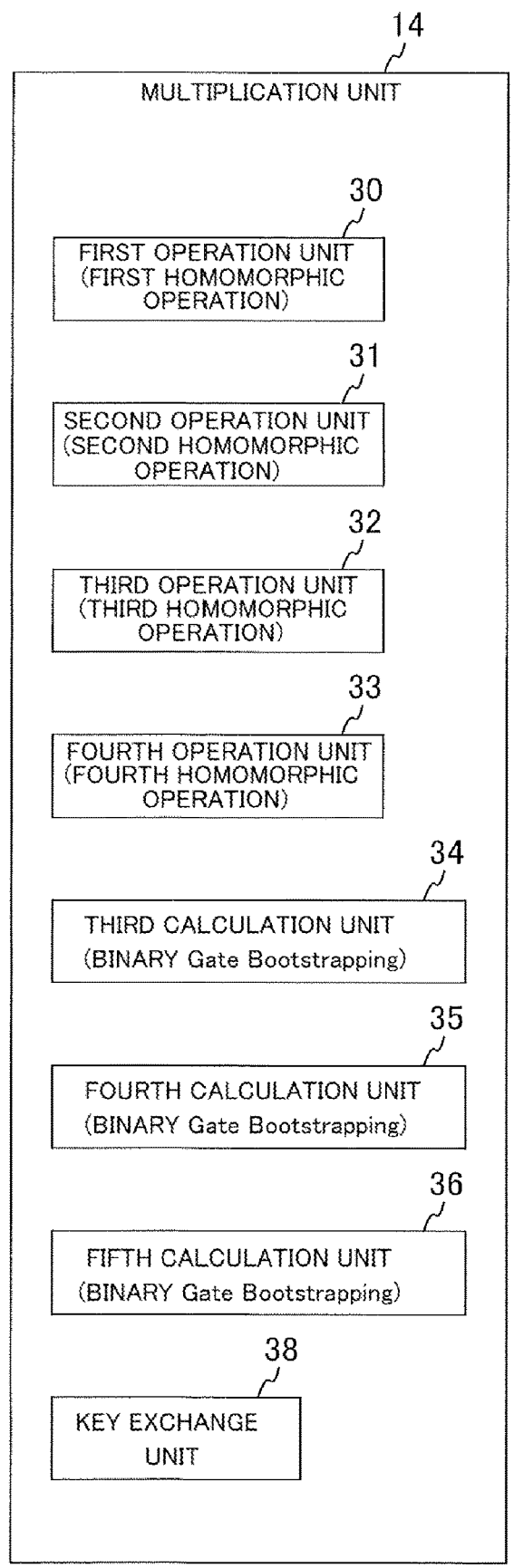
FIG. 2 is an explanatory diagram of a functional configuration of a multiplication unit.

FIG. 2 is an explanatory diagram of a functional configuration of the multiplication unit in FIG. 1.

The multiplication unit 14 includes a first operation unit 30, a second operation unit 31, a third operation unit 32, a fourth operation unit 33, a third Bootstrapping unit (a calculation unit) 34, a fourth Bootstrapping unit (a calculation unit) 35, a fifth Bootstrapping unit (a calculation unit) 36, and a key exchange unit 38.

The first operation unit 30 performs a first homomorphic operation for a ciphertext output from the third Bootstrapping unit 34.

The second operation unit 31 performs a second homomorphic operation for a ciphertext output from the first operation unit 30.

The third operation unit 32 performs a third homomorphic operation for a ciphertext output in the middle of processing by the fourth Bootstrapping unit 35.

The fourth operation unit 33 performs a fourth homomorphic operation for a ciphertext output in the middle of processing by the fifth Bootstrapping unit 36.

The third Bootstrapping unit 34 performs third Bootstrapping for a ciphertext output from the key exchange unit 38 and an input ciphertext.

The fourth Bootstrapping unit 35 performs fourth Bootstrapping for a ciphertext output from the second operation unit 31.

The fifth Bootstrapping unit 36 performs fifth Bootstrapping for a ciphertext output from the fourth Bootstrapping unit 35.

The key exchange unit 38 performs Private Key Switching, described later, that exchanges a private key of an input ciphertext. Private Key Switching is essentially performed for obtaining a TRLWE ciphertext having a stepped polynomial as its plaintext from a TLWE ciphertext as a multiplier, and exchange of a private key of a ciphertext is not an end in itself. Another method may be used as long as a TRLWE ciphertext having a stepped polynomial as its plaintext (a plaintext polynomial) is obtained.

In FIGS. 1 and 2, the first, second, third, and fourth operation units 30, 31, 32, and 33 are arithmetic processing units each of which implements a homomorphic operation described below, by software.

The first, second, third, fourth, and fifth Bootstrapping units 12, 13, 34, 35, and 36 are arithmetic processing units each of which implements Gate Bootstrapping described below, by software.

The key exchange unit 38 is an arithmetic processing unit that implements Private Key Switching by software.

At least one of the first, second, third, and fourth operation units 30, 31, 32, and 33, the first, second, third, fourth, and fifth Bootstrapping units 12, 13, 34, 35, and 36, and the key exchange unit 38 may be implemented by hardware.

FIGS. 3A to 3D are explanatory diagrams of an operation process based on the functional configuration in FIG. 1.

The configuration illustrated in FIGS. 3A to 3D and 4 described later uses Gate Bootstrapping presented in the aforementioned paper. Gate Bootstrapping in TFHE presented in the aforementioned paper will be described in detail below.

In the following descriptions, a TLWE ciphertext ca is a ciphertext of a plaintext integer a that is a dividend, and a TLWE ciphertext cb is a ciphertext of a plaintext integer b as a divisor.

Figure 3A:
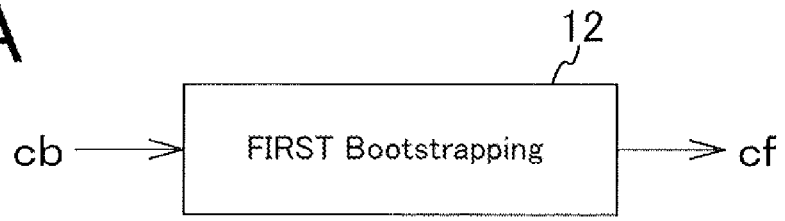
FIGS. 3A, 3B, 3C, and 3D are explanatory diagrams of an operation process based on the functional configuration in FIG. 1.

In FIG. 3A, the encryption processing device 1 inputs the TLWE ciphertext cb to the first Bootstrapping unit 12 and performs the first Bootstrapping, thereby obtaining a TLWE ciphertext cf.

Figure 3B:
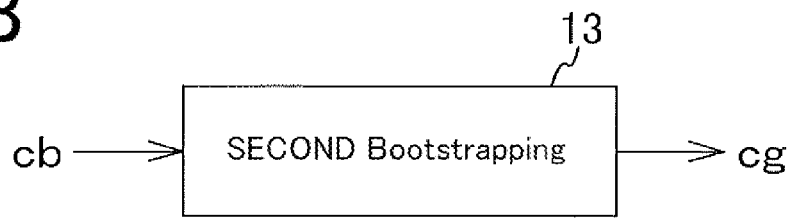

In FIG. 3B, the encryption processing device 1 inputs the TLWE ciphertext cb to the second Bootstrapping unit 13 and performs second Bootstrapping, thereby obtaining a TLWE ciphertext cg.

Figure 3C:
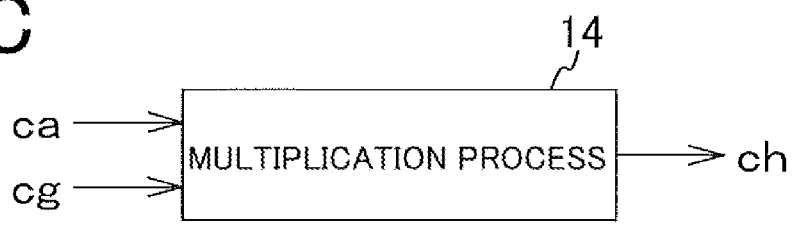

In FIG. 3C, the encryption processing device 1 inputs the TLWE ciphertext ca and the TLWE ciphertext cg to the multiplication unit 14 and performs a multiplication process, thereby obtaining a TLWE ciphertext ch.

Figure 3D:
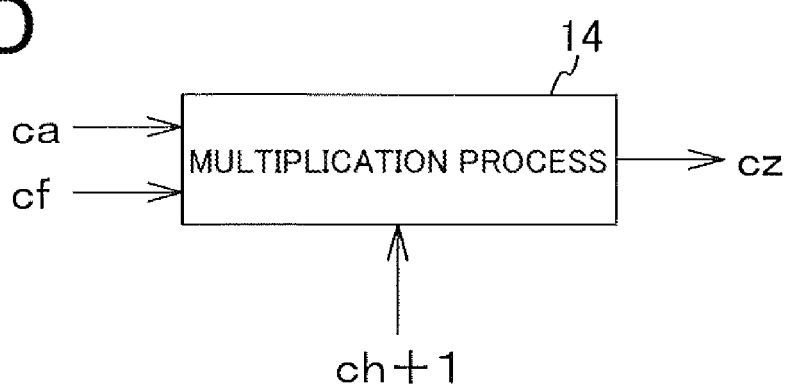

In FIG. 3D, the encryption processing device 1 inputs the TLWE ciphertext ca and the TLWE ciphertext cf to the multiplication unit 14, performs a multiplication process, and performs a homomorphic operation with the TLWE ciphertext ch and 1, thereby obtaining a TLWE ciphertext cz that is a result of division.

FIG. 4 is a more detailed explanatory diagram of an operation process of multiplication based on the functional configuration in FIG. 2.

The encryption processing device 1 inputs a TLWE ciphertext cB as a multiplier to the key exchange unit 38 and performs Private Key Switching for the ciphertext cB with a key switching key KS, thereby obtaining a TRLWE ciphertext cc having a stepped polynomial as its plaintext.

The encryption processing device 1 inputs the TRLWE ciphertext cc to the third Bootstrapping unit 34 and performs the third Bootstrapping, thereby obtaining a TLWE ciphertext cc'. In more detail, the third Bootstrapping unit 34 performs BlindRotate using the TRLWE ciphertext cc having a stepped polynomial as its plaintext and the TLWE ciphertext ca and further performs SampleExtract, thereby obtaining the ciphertext cc'.

Although the process of performing Private Key Switching is described as being performed by the key exchange unit 38, Private Key Switching can be considered as a part of the third Bootstrapping. In this case, the third Bootstrapping unit 34 may perform Private Key Switching, and the encryption processing device 1 may not include the key exchange unit 38.

The ciphertext cc' thus obtained is a ciphertext corresponding to a result aB of multiplication of a plaintext a and a plaintext B. However, since the denominator of the plaintext of the ciphertext cc' is $t^2$ as described later, this ciphertext cannot be used in subsequent multiplication. Therefore, the encryption processing device 1 subsequently performs a process for converting the denominator of a plaintext to t.

The encryption processing device 1 inputs the ciphertext cc' to the first operation unit 30 and performs an operation of adding a ciphertext Y that is an error adjustment value in a homomorphic manner, thereby obtaining a new ciphertext cc'. When addition of the error adjustment value is not necessary, 0 is added.

The encryption processing device 1 inputs the ciphertext cc' to the second operation unit 31 and performs an operation of multiplying the ciphertext cc' by t. The encryption processing device 1 inputs the ciphertext cc' multiplied by t to the fourth Bootstrapping unit 35 and performs the fourth Bootstrapping, thereby obtaining a ciphertext cl. In more detail, the fourth Bootstrapping unit 35 performs BlindRotate and SampleExtract for the ciphertext cc' multiplied by t to obtain the ciphertext cd. The encryption processing device 1 inputs the ciphertext cd to the third operation unit 32 and performs an operation of adding the ciphertext cd to the ciphertext cc' multiplied by t, cc'×t+cd−(0, ¼). The encryption processing device 1 (the fourth Bootstrapping unit 35) performs Public Key Switching for the result of that operation to obtain a TLWE ciphertext cl corresponding to lower bits of the multiplication result.

In order to obtain higher bits of the multiplication result, the encryption processing device 1 inputs the ciphertext cl corresponding to the lower bits of the multiplication result to the fifth Bootstrapping unit 36 and performs the fifth Bootstrapping, thereby obtaining a TLWE ciphertext cu'. In more detail, the fifth Bootstrapping unit 36 performs BlindRotate and SampleExtract for the ciphertext cl to obtain a ciphertext cl'. The encryption processing device 1 inputs the ciphertext cl' and the ciphertext cc' to the fourth operation unit 33 and performs an operation of subtracting cl' from cc', cc'−cl'. The encryption processing device 1 (the fifth Bootstrapping unit 36) performs Public Key Switching for the result of the operation by the third operation unit 14 to obtain the TLWE ciphertext cu' corresponding to the higher bits of the multiplication result.

The lower bits and the higher bits of the multiplication result are a predetermined number of lower bits and the remaining bits, respectively, when the multiplication result is expressed in binary. This is the expression when t is a power of 2. For a different value, only the expression is changed while what is meant by the lower bits and the higher bits is essentially unchanged.

Gate Bootstrapping explained in TFHE is described in detail.

Gate Bootstrapping is a method for making fully homomorphic encryption, which has not been practical because of a huge amount of data and its operation time, practical.

TFHE in the aforementioned paper uses encryption in which LWE (Learning with Errors) encryption is configured over a circle group, so called "TLWE encryption", and achieves various types of homomorphic logical operations (and furthermore any operation such as addition and multiplication) between TLWE ciphertexts at high speed with small data size while making an error in an operation small.

An input of Gate Bootstrapping in TFHE is a TLWE ciphertext encrypted with a private key.

TFHE achieves fully homomorphic encryption (FHE) based on TLWE ciphertexts.

TLWE encryption is a unique case of LWE encryption (obtained by defining LWE encryption over a circle group) that is one type of lattice-based cryptography.

TLWE encryption is additively homomorphic and is known as being able to perform an additive operation between plaintexts encrypted by TLWE encryption without decrypting ciphertexts.

Figure 5:
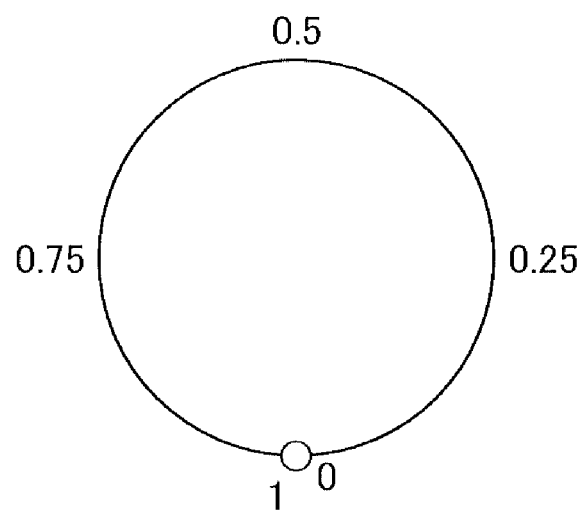
FIG. 5 is an image diagram for explaining a circle group that TLWE encryption has as a plaintext.

FIG. 5 is an image diagram for explaining a circle group that TLWE encryption has as a plaintext.

TLWE encryption has any point on a circle group $\{T\}$ illustrated in FIG. 5, which moves from 0 to 1 with a real number precision and, when reaching 1, returns to 0, and uses a range near 0 (including an error) and a range near $\mu$ (including an error) as a plaintext.

The point on the circle group $\{T\}$ is also described as an "element" in the present specification.

An encryption processing device handling TFHE performs a generic homomorphic operation, for example, an additive operation as an operation between such TLWE ciphertexts, and makes an error of the operation result fall within an appropriate range by Gate Bootstrapping, thereby achieving fully homomorphic encryption (FHE) that allows a logical operation to be performed again (in the latter stage).

Regardless of whether the value of the exponent part of X is positive or negative, when an element F(X) of a factor ring of a polynomial ring is repeatedly multiplied by X n times, the signs of all the terms are reversed, and when this multiplication is repeated 2n times, the signs of all the terms return to the original signs.

In addition, multiplication by $X^{-1}$ is an inverse operation of multiplication by X. Therefore, when multiplication by $X^{-1}$ is repeated, a change opposite to the case where multiplication by X is repeated occurs. That is, when multiplication by $X^{-1}$ is repeated n times, the signs of all the terms are reversed, and when this multiplication is repeated 2n times, the signs of all the terms return to the original signs.

As described above, when the element F(X) of the factor ring of the polynomial ring is repeatedly multiplied by X or $X^{-1}$ n times, the signs of all the terms are reversed, and when this multiplication is repeated 2n times, the signs of all the terms return to the original signs.

In this cyclic group, attention is paid to the fact that it can be rotated in either direction, and expressions such as multiplication is repeated −n times and multiplication is repeated −2n times may be used for the sake of convenience.

TLWE Encryption

TLWE Encryption is Described.

A vector [a] in which N random numbers uniformly distributed are collected is prepared as an element on the circle group $\{T\}$. In addition, a private key [s] in which N values each being 0 or 1 are collected is prepared.

Assuming that a random number in the Gaussian distribution (the normal distribution) in which an average value is a plaintext $\mu$ and a variance is preset to $\alpha$ is e, an example of a TLWE ciphertext is a pair ([a], [s]·[a]+e).

An average value of e when an infinite number of TLWE ciphertexts are created for the same plaintext $\mu$ is a plaintext $\mu$, where $\mu$ is a plaintext without an error and e is a plaintext with an error.

Symbol "·" represents a dot product of vectors. This description is also applied to the following descriptions.

When [s]·[a]+e described above is written as b, the TLWE ciphertext can be represented as ([a], b).

A function $\varphi_s$ (([a], b))=b−[s]·[a]=e is a function of decrypting the TLWE ciphertext. Since TLWE encryption adds a dot product of a private key vector and a random number vector and an error to a plaintext to encrypt the plaintext, TLWE encryption can be decrypted with the error by calculating the dot product of the private key vector and the random number vector. At this time, if the private key vector is unknown, a component serving as the dot product cannot be calculated, and therefore decryption cannot be performed.

This TLWE encryption is additively homomorphic and allows an additive operation between plaintexts of TLWE ciphertexts to be performed without decrypting the ciphertexts.

When ([a]+[a'], b+b') obtained by adding two TLWE ciphertexts ([a], b) and ([a'], b') together as they are is input to the aforementioned decryption function $\varphi_s$, a sum of the two plaintexts is obtained as represented by $\varphi_s$ (([a]+[a'], b+b'))=(b+b')−[s]·([a]+[a'])=(b−[s]·[a])+(b'−[s]·[a'])=$\varphi_s$([a], b)+$\varphi_s$([a'], b'). It is thus found that a TLWE ciphertext is a ciphertext obtained by "additive homomorphic encryption".

In TFHE in the aforementioned paper, various operations are achieved by repeating "performing an additive operation for TLWE ciphertexts each obtained by adding an error to a plaintext and reducing an error by Gate Bootstrapping".

In the following descriptions, a "trivial ciphertext" such as ([0], $\mu$) is a TLWE ciphertext that can be decrypted with any private key, that is, a ciphertext that can be decrypted with any private key to provide the same plaintext.

In ([0], $\mu$), [0] represents a zero vector.

Although the "trivial ciphertext" can be handled as a TLWE ciphertext, it can be considered as a state where a plaintext is placed in the ciphertext substantially as it is.

When the decryption function $\varphi_s$ is applied to the TLWE ciphertext ([0], $\mu$), the private key [s] is multiplied by the zero vector [0] to disappear as represented by $\varphi_s$ (([0], $\mu$))=$\mu$−[s]·0=$\mu$. The plaintext $\mu$ is thus obtained easily. Such a ciphertext is a trivial ciphertext with regard to the plaintext $\mu$.

A finite cyclic group used in Gate Bootstrapping in TFHE is described.

Gate Bootstrapping uses a factor ring of a polynomial ring as a finite cyclic group.

The following description explains that a factor ring of a polynomial ring is a finite cyclic group.

An n-th order polynomial is generally represented by $a_n x^n + a_{n-1} x^{n-1} + \ldots + a_0$.

These all sets form a commutative group for the sum f(x)+g(x) of polynomials.

Further, the product f(x)g(x) of polynomials has properties identical to those of the commutative group except that an inverse element is not necessarily present. Such a structure is called "monoid".

Regarding the sum and the product of polynomials, the distributive property is established as follows.

$$f(x)\{g(x)+g'(x)\}=f(x)g(x)+f(x)g'(x)$$

Therefore, when the sum and the product of polynomials are defined by regarding polynomials as elements, a "ring" is formed, which is called a polynomial ring.

TFHE uses a polynomial ring including the circle group {T} as coefficients, and such a polynomial ring is represented as T[X].

When a polynomial T(X), which is a polynomial ring, is decomposed into $T[X](X^n+1)+T[X]$, and only remainders are extracted and collected, a factor ring of a polynomial ring is obtained because the remainders also form a "ring".

In TFHE, the factor ring of a polynomial ring is represented as $T[X]/(X^n+1)$.

A polynomial $F(X)=\mu X^{n-1}+\mu X^{n-2}+ \ldots +\mu X+\mu$ is extracted by using a desired coefficient μ (μ belongs to T) as an element of the factor ring of the polynomial ring $T[X]/(X^n+1)$.

When the element F(X) of the factor ring of the polynomial ring is multiplied by X, $\mu X^{n-1}+\mu X^{n-2}+ \ldots +\mu X-\mu$ is obtained, and the coefficient of the top term appears as a constant term with a sign reversed from positive to negative.

When multiplication by X is further performed, the same phenomenon happens again as represented by $\mu X^{n-1}+\mu X^{n-2}+ \ldots \mu X^2-\mu X-\mu$ (the coefficient of the top term appears as a constant term with a sign reversed from positive to negative).

When this multiplication is repeated n times, $-\mu X_{n-1}-\mu X^{n-2} \ldots -\mu X-\mu$ is obtained, so that the coefficients of all terms become negative.

When multiplication by X is further continued, the coefficient of the top term becomes positive from negative and appears as a constant term as represented by $$-\mu X^{n-1}-\mu X^{n-2} \ldots -\mu X+\mu$$

$$-\mu X^{n-1}-\mu X^{n-2} \ldots +\mu X+\mu.$$

When multiplication by X is repeated 2n times in total, the multiplication result returns to the original element of the factor ring of the polynomial ring $F(X)=\mu X^{n-1}+\mu X^{n-2}+ \ldots +\mu+\mu$. As described above, the highest-order coefficient (μ) appears as the lowest-order constant term with a reversed sign (−μ), and terms are shifted by one in whole.

That is, the polynomial $F(X)=\mu X^{n-1}+\mu X^{n-2}+ \ldots +\mu X+\mu$ is a finite cyclic group of order 2n in a ring that is the factor ring of the polynomial ring $T[X]/(X^n+1)$.

In TFHE, an encryption processing device achieves fully homomorphic encryption by using such properties of the polynomial F(X) based on a factor ring of a polynomial ring.

Regardless of whether the value of X is positive or negative, when the element F(X) of the factor ring of the polynomial ring is repeatedly multiplied by X n times, the signs of all the terms are reversed, and when this multiplication is repeated 2n times, the signs of all the terms return to the original signs.

TRLWE Encryption

Gate Bootstrapping uses encryption called TRLWE encryption in addition to TLWE encryption.

TRLWE Encryption is Described.

The character R in TRLWE encryption means a ring, and TRLWE encryption is LWE encryption configured by a ring. TRLWE is also additive homomorphic encryption, as TLWE encryption is.

A ring in TRLWE encryption is the factor ring of the polynomial ring $T[X]/(X^n+1)$ described above.

In order to obtain TRLWE encryption, elements of the factor ring of the polynomial ring $T[X]/(X^n+1)$ are selected at random.

In fact, n coefficients in an (n−1)th order polynomial are selected as uniformly distributed random numbers from the circle group {T}.

When the order of the polynomial is n−1, the polynomial is not divided by $X^n+1$, and it is not necessary to consider a remainder. Therefore, it is assumed that the (n−1)th order polynomial is a polynomial a(X).

A polynomial s(X) used as a private key described below is structured as follows, by collecting n values each being 0 or 1 at random.

$$s(X)=s_{-1}X^{n-1}+s_{n-2}+ \ldots X+s_0$$

Assuming that n random numbers $e_i$ are random numbers in the Gaussian distribution (the normal distribution) in which an average value is a plaintext $\mu_i$ and a variance is α, the following polynomial e(X) is structured from these random numbers.

$$e(X)=e_{n-1}X^{n-1}+e_{n-2}X^{n-2}+ \ldots e_1X+e_0$$

Decomposition of s(X)·a(X)+e(X) is performed into $f(X)(X^n+1)+b(X)$, and b(X) is obtained.

Consequently, (a(X), b(X)) is obtained as a TRLWE ciphertext.

In TRLWE encryption, encryption is performed using random numbers similarly to TLWE encryption, and therefore innumerable ciphertexts can correspond to the same private key and the same plaintext.

In addition, in TRLWE encryption, g(X) determined in such a manner that cps becomes an element of $T[X]/(X^n+1)$ serves as a decryption function, where $\varphi_s((a(X), b(X))=b(X)-s(X)\cdot a(X)+g(X)(X^n+1)$, as in TLWE encryption. In other words, $(b(X)-s(X)\cdot a(X)) \bmod (X^n+1)$ serves as a decryption function, where mod is a remainder of division.

Gadget Decomposition

Gadget Decomposition is described.

A coefficient in a polynomial used in a TRLWE ciphertext is a real number that is an element of the circle group {T} in FIG. 5 and is equal to or larger than 0 and less than 1, and only has a fractional part.

An operation of decomposing this coefficient into several bits in binary notation is defined as Gadget Decomposition (Dec) in TFHE in the aforementioned paper.

For example, assuming that the degree n of the polynomial F(X) of a TRLWE ciphertext is 2, one unit of decomposition is $Bg=2^2$, and decomposition into l=3 elements is performed. At this time, each element is arranged to enter between −Bg/2 and Bg/2.

A TRLWE ciphertext is a combination of two polynomials like (a(X), b(X)) as described above. Therefore, a TRLWE ciphertext d can be written as $$d=[0.75X^2+0.125X+0.5, 0.25X^2+0.5X+0.375]$$

by being regarded as a two-dimensional vector having polynomials that serve as elements of a factor ring of a polynomial ring, as elements. Accordingly, in the following descriptions, each element is decomposed into the form of a sum of powers of $Bg^{-1}=0.25$.

Since 0.75=−0.25 is established on the circle group {T}, decomposition can be performed as follows.

$$d = [0.75X^2 + 0.125X + 0.5, 0.25X^2 + 0.5X + 0.375]$$

$$= [-0.25X^2 + 0.125X + 0.5, 0.25X^2 + 0.5X + 0.25 + 0.125]$$

-continued $$= [0.25 \times (-X^2 + 2) + 0.25^2 + 2X + 0.25^3 \times 0,$$
$$0.25 \times (X^2 + 2X + 1) + 0.25X^2 \times 2 + 0.25^3 \times 0]$$

Therefore, when Gadget Decomposition is performed, a vector $$Dec(d) = [-X_2 + 2, 2X, 0, X^2 + 2X + 1, 2, 0]$$

is obtained.

An operator H of inverse transform from a vector to a ciphertext is also defined.

When the description is provided based on the example described above, a matrix $$H = \begin{pmatrix} 0.25 & 0 \\ 0.25^2 & 0 \\ 0.25^3 & 0 \\ 0 & 0.25 \\ 0 & 0.25^2 \\ 0 & 0.25^3 \end{pmatrix}$$

becomes the operator H of the inverse transform. A TRLWE ciphertext d is obtained by performing an operation Dec(d)·H. The lower bits are rounded off.

It can also be said that an operation of obtaining [v] that makes $\|d-[v]\cdot H\|$ minimum with respect to the TRLWE ciphertext d is Gadget Decomposition. Here, ∥ is a vector norm (length).

Ciphertexts $Z_i=(a(X), b(X))$ formed by polynomials in which all coefficients of e(X) have an average value of 0 and a variance is α are created. The number of the created ciphertexts is 2ℓ.

The plaintext μ is encrypted in the following manner, whereby the following ciphertext k is obtained.

$$k = \begin{pmatrix} Z_1 \\ Z_2 \\ \vdots \\ Z_{2\ell} \end{pmatrix} + \mu \times H$$

This ciphertext k is defined as a TRGSW ciphertext BK.

The TRGSW ciphertext BK configures a Bootstrapping Key used below.

The Bootstrapping Key is described.

The Bootstrapping Key is used for keeping a private key encrypted in order to use the private key in Gate Bootstrapping.

Separately from the private key [s] (Nth order) used for TLWE ciphertexts, each element of a private key [s'] for encrypting the private key [s] is selected to be either of two values, i.e., 0 or 1 for use in Gate Bootstrapping.

It is necessary to make the order of the private key [s'] the same as the order n of polynomials used in TRLWE encryption.

The TRGSW ciphertext BK is created for each element of the private key [s].

When decryption with the private key [s'] is performed, 2ℓ TRLWE ciphertexts $Z_j$ are created where $\varphi_{s'}(Z_j)=0$ is satisfied.

$BK_i$ is then represented by $$BK_i = \begin{pmatrix} Z_1 \\ Z_2 \\ \vdots \\ Z_{2\ell} \end{pmatrix} + s_i \cdot H$$

as in the above-described configuration of the TRGSW ciphertext.

N TRGSW ciphertexts are prepared, where N is the same as the order of the private key [s]. A set of the N TRGSW ciphertexts thus prepared is referred to as "Bootstrapping Key".

The cross product of the TRGSW ciphertext $BK_i$ and the TRLWE ciphertext d is defined as follows.

$$BK_i \times d = Dec(d) \cdot BK_i$$

Gadget Decomposition is an operation of obtaining [v] that makes $\|d-[v]\cdot H\|$ minimum with respect to the TRLWE ciphertext d.

Therefore, by using [v]=Dec(d) and an error $(\varepsilon_a(X), \varepsilon_b(X))$, $[v]\cdot H=d+(\varepsilon_a(X), \varepsilon_b(X))$ can be written.

As a result, $BK_i \times d = Dec(d) \cdot BK_i$ $$= \vec{v} \cdot \begin{pmatrix} Z_1 \\ Z_2 \\ \vdots \\ Z_{2\ell} \end{pmatrix} + s_i \times \vec{v} \cdot H$$

is obtained.

When the left side calculates the dot product, and $[v]\cdot H=d+(\varepsilon_a(X), \varepsilon_b(X))$ is substituted into the right side, $$= \sum_{j=1}^{2\ell} v_j \times Z_j - s_i \times (d + (\epsilon_a(X), \epsilon_b(X)))$$

$$= \sum_{j=1}^{2\ell} v_j \times Z_j - s_i \times d + s_i \times (\epsilon_a(X), \epsilon_b(X))$$

is obtained, and becomes the same as calculation of the sum of the following three ciphertexts c1, c2, and c3.

$$c_1 = \sum_{j=1}^{2\ell} v_j \times Z_j$$

$$c_2 = s_i \times d$$

$$c_3 = s_i \times) \in_a(X), \varepsilon_b(X))$$

Since TRLWE encryption is additive homomorphic encryption, calculating the sum of ciphertexts is the same as calculating the sum of plaintexts.

Since $c_1$ is obtained by adding several times of $Z_j$, an expected value of the plaintext $\varphi_{s'}(c_1)$ is 0.

In addition, $\varphi_{s'}(c3)$ obtained by decryption is set to be sufficiently small also in the subsequent operations, because the magnitude of an absolute value of a plaintext can be limited by a system parameter.

In this case, $\varphi_{s'}(BK_i \times d)=\varphi_{s'}(s_i \times d)$ is obtained, but the calculation result is the sum of the above three ciphertexts c1, c2, and c3 regardless of whether $s_i$ is 0 or 1. Whether $s_i$ is 0 or 1 cannot be determined by a simple comparison.

Assuming that there are TRLWE ciphertexts $d_0$ and $d_1$ respectively corresponding to two plaintexts $\mu_0$ and $\mu_1$, when $d_1-d_0$ is substituted for d, and $d_0$ is finally added, the following CMux function is completed.

$$CMux(BK_i, d_0, d_1) = BK_i \times (d_1-d_0) + d_0 = Dec(d_1-d_0) \cdot BK_i + d_0$$

The CMux function outputs a ciphertext of the plaintext to without decrypting the ciphertext when $s_i$ is 0, and outputs a ciphertext of the plaintext $\mu_i$ without decrypting the ciphertext when $s_i$ is 1.

Although the CMux function can calculate the ciphertext of the plaintext $\mu_0$ or the plaintext $\mu_1$, it is not possible to know which one is selected.

Binary Gate Bootstrapping in TFHE is performed using various information described above.

Binary Gate Bootstrapping is configured by three steps described below, i.e., (1) BlindRotate, (2) SampleExtract, and (3) Public Key Switching.

Figure 6:
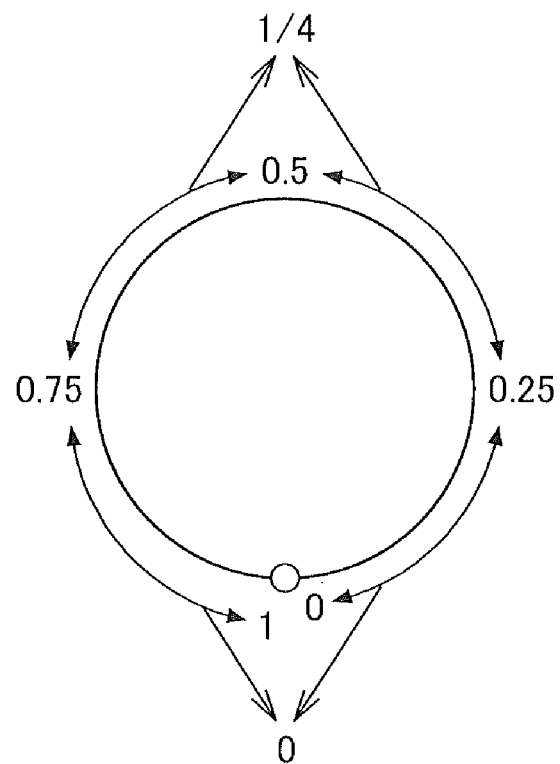
FIG. 6 is an operation image diagram of binary Gate Bootstrapping.

FIG. 6 is an operation image diagram of binary Gate Bootstrapping.

Binary Gate Bootstrapping reduces an error for a plaintext included in a result of a homomorphic operation between TLWE ciphertexts by three steps descried below.

In the following descriptions, unless otherwise specified, a plaintext means a result of an operation between plaintexts obtained as a result of an operation between TLWE ciphertexts.

A plaintext in a section from 0 to 0.25 (¼) or 0.75 (¾) to 1 on the circle group {T} in FIG. 5 is converted to a TLWE ciphertext 0, and a plaintext in a section from 0.25 (¼) to 0.75 (¾) is converted to a ciphertext 0.25 (¼).

An error added to the plaintext in this conversion is any error in a range of ±⅟₁₆.

(1) BlindRotate

BlindRotate is performed as the first step of Gate Bootstrapping.

BlindRotate is a process of creating a TRLWE ciphertext.

In BlindRotate, from a trivial TRLWE ciphertext (0, T(X)) whose plaintext is a polynomial T(X), a TRLWE ciphertext multiplied by $X^{\varphi s(c')}$ is obtained without decryption. "0" indicates a 0th degree polynomial 0.

Here, $\varphi_s(c')$ is a plaintext obtained by applying a decryption function to the following LWE ciphertext c'.

In BlindRotate, the following polynomial T(X)

$$T(X)=F(X)\cdot X^{n/2}$$

is prepared, which is obtained by multiplying the following polynomial F(X)

$$F(X)=\mu X^{n-1}+\mu X^{n-2}+\ldots \mu X+\mu,$$

where $\mu=⅛$,
that forms the above-described finite cyclic group and serves as a test vector, by $X^{n/2}$.

It is assumed that there is a TLWE ciphertext c obtained by encrypting the plaintext $\mu 1$ with the private key [s].

Each element of this TLWE ciphertext c=([a], b) is multiplied by 2n and is then rounded off, whereby a LWE ciphertext c'=([a'], b') is obtained.

When the LWE ciphertext c'=([a'], b') is decrypted, $\mu 1'=\varphi_s(c')\approx 2n\times\varphi_s(c)=2n\mu 1$ is obtained. As n becomes larger, an error becomes smaller relatively.

A trivial TRLWE ciphertext (0, T(X)) whose plaintext is the polynomial T(X) is prepared, and it is assumed that $A_0=X_{-b'}\times(0, T(X))=(0, X_{-b'}\times T(X))$, where 0 indicates a 0th order polynomial 0. Since b' is an integer, exponentiation can be defined naturally.

Subsequently, $A_i=CMux(BK_i, A_{i-1}, X^{a'i}A_{i-1})$ is calculated in turn by using $BK_i$ that is the above-described Bootstrapping Key. Since a'i is also an integer also in this expression, a power of X can be defined naturally.

Accordingly, the plaintext is not changed when $s_i$ is 0, and multiplication by $X_a^{ai}$ is performed in turn when $s_i$ is 1.

Therefore when calculation is repeated as represented by $$\phi_s(A_0)=X^{-b'}T(X)$$

$$\phi_s(A_1)=X^{s_1a_1'-b'}T(X)$$

$$\phi_s(A_2)=X^{s_2a_2'+s_1a_1'-b'}T(X),$$

then $$\varphi_s(A_n)=X^{\Sigma_{i=1}^{N}s_i\times a_i'-b'}T(X)$$

is obtained.
Here, $$\Sigma_{i=1}^{N}s_i\times a_i'-b'$$

is equal to the decryption function $\varphi s(c')$ with the sign reversed. Therefore, $$\varphi_s'(A_n)=X^{\varphi s(c')}T(X)$$

is obtained. Here, $\varphi_s(A_n)$ is a ciphertext of a polynomial obtained by multiplying the polynomial T(X) by $X^{-1}$ $\mu l'$ times.

In association with the plaintext $\mu 1$ of the TLWE ciphertext c related to BlindRotate, unique values (up to 2n values including n coefficients and n values obtained by reversing the signs of the coefficients) in accordance with the number of times $\mu l'$ (=2n$\mu l$) of multiplying the polynomial T(X) by X is obtained as the coefficient of the constant term of the plaintext polynomial, and therefore this can be regarded as a kind of lookup table.

(2) SampleExtract

In the plaintext polynomial cps $\varphi_s(A_n)$ obtained by decrypting the TRLWE ciphertext $A_n$ obtained by BlindRotate in (1), n/2–$\varphi_s(c')$ terms from the lowest term have a coefficient of –$\mu$. When $\varphi_s(A_n)$ is negative, coefficients are –$\mu$ from the highest term in turn conversely.

When attention is paid only to a constant term of the plaintext polynomial $\varphi_s(A_n)$ obtained by decrypting the TRLWE ciphertext $A_n$, the constant term is $\mu$ if $\varphi_s(c')$ is equal to or greater than n/2 and less than 3n/2, that is, $\varphi_s(c)$ is ½±¼. Otherwise, i.e., if $\varphi_s(c)$ is ±¼, the constant term is –$\mu$.

SampleExtract is a process for extracting only the coefficient of the constant term of the plaintext polynomial $\varphi_s(A_n)$ from the TRLWE ciphertext $A_n$ obtained by BlindRotate in (1) without decrypting the TRLWE ciphertext $A_n$, thereby obtaining a TLWE ciphertext cs.

The process for obtaining the TLWE ciphertext cs is described.

All TRLWE ciphertexts can be expressed as (A(X), B(X)) by putting polynomials as $$A(X)=\Sigma_{i=1}^{n}a_iX^{i-1}$$

$$B(X)=\Sigma_{i=1}^{n}b_iX^{i-1}$$

where n is the order.

When decryption with the private key [s'] is performed, the expression can be expanded by putting a polynomial of the private key as $$S'(X)=\Sigma_{j=1}^{n}s_j'X^{j-1}.$$

Then, $$\varphi_s'(c)=B(X)-S'(X)\cdot A(X)=\Sigma_{i=1}^{n}b_iX^{i-1}-\Sigma_{i=1}^{n}\Sigma_{j=1}^{n}a_is_j'X^{(i+j-2)}$$

is obtained.

The following operation is then performed with regard to this expression.

$$\sum_{i=1}^{n} b_i X^{i-1} - \sum_{i=1}^{n} \sum_{j=1}^{n} a_i s'_j X^{(i+j-2)} = \sum_{i=1}^{n} b_i X^{i-1} - \sum_{i=1}^{n} \sum_{j=i-1}^{n+i-2} a_i s'_{j-i+2} X^j$$

$$= \sum_{i=1}^{n} b_i X^{i-1} - \sum_{i=1}^{n} \sum_{j=i-1}^{n-1} a_i s'_{j-i+2} X^j - \sum_{i=1}^{n} \sum_{j=n}^{n+i-2} a_i s'_{j-i+2} X^j$$

$$= \sum_{j=1}^{n} b_j X^{j-1} - \sum_{j=0}^{n-1} \sum_{i=1}^{j+1} a_i s'_{j-i+2} X^j - \sum_{j=n}^{2n-2} \sum_{i=j-n+2}^{n} a_i s'_{j-i+2} X^j$$

$$= \sum_{j=0}^{n-1} b_{j+1} X^j - \sum_{j=0}^{n-1} \sum_{k=0}^{j} a_{i+1} s'_{j-i+1} X^j - \sum_{j=0}^{n-2} \sum_{k=j-n+1}^{-1} a_{i+n+1} s'_{j-i+1} X^{j+n}$$

$$= \sum_{j=0}^{n-2} b_{j+1} X^j + b_n X^{n-1} - \sum_{j=0}^{n-2} \sum_{k=0}^{j} a_{i+1} s'_{j-i+1} X^j - \sum_{k=0}^{n-1} a_{i+1} s'_{n-i} X^{n-1} -$$

$$\sum_{j=0}^{n-2} \sum_{k=j-n+1}^{-1} a_{i+n+1} s'_{j-i+1} X^{j+n}$$

$$= \sum_{j=0}^{n-2} \left( b_{j+1} X^j - \sum_{k=0}^{j} a_{i+1} s'_{j-i+1} X^j - \sum_{k=j-n+1}^{-1} a_{i+n+1} s'_{j-i+1} X^{j+n} \right) + b_N X^{n-1} -$$

$$\sum_{k=0}^{n-1} a_{i+1} s'_{n+1} X^{n-1}$$

Since this is "a factor ring of a polynomial ring", the remainder when this is divided by $(X^n+1)$ is calculated. Then, $$\Sigma_{j=0}^{n-2}(b_{j+1}X^j - \Sigma_{i=0}^{j} a_{i+1}s'_{j-i+1}X_j + \Sigma_{i=j-n+1}^{-1} a_{i+n+1}s'_{j-i+1}X^j) + b_N X^{n-1} - \Sigma_{i=0}^{n-1} a_{i+1}s'_{n-i}X^{n-1} = \Sigma_{j=0}^{n-2}(b_{j+1} - \Sigma_{i=0}^{j} a_{i+1}s'_{j-i+1} + \Sigma_{i=j-n+1}^{-1} a_{i+n+1}s'_{j-i+1})X_j + (b_n - \Sigma_{i=0}^{n-1} a_{i+1}s'_{n-i})X^{n-1}$$

is obtained.
Further, when $$a'_i = \begin{cases} a_i & (i \geq 1) \\ -a_{i+n} & \text{(otherwise)} \end{cases}$$

is put, then $$= \sum_{j=0}^{n-2} \left( b_{j+1} - \sum_{k=0}^{j} a'_{i+1} s'_{j-i+1} - \sum_{k=j-n+1}^{-1} a_{i+1} s'_{j-i+1} \right) X^j + \left( b_N - \sum_{k=0}^{n-1} a'_{i+1} s'_{n-i} \right) X^{n-1}$$

$$= \sum_{j=0}^{n-2} \left( b_{j+1} - \sum_{k=j-n+1}^{j} a'_{i+1} s'_{j-i+1} \right) X^j + \left( b_N - \sum_{k=0}^{n-1} a'_{i+1} s'_{n-i} \right) X^{n-1}$$

$$= \sum_{j=0}^{n-2} \left( b_{j+1} - \sum_{k=0}^{n-1} a'_{i+j-n+2} s'_{n-i} \right) X^j + \left( b_N - \sum_{k=0}^{n-1} a_{i+1} s'_{n-i} \right) X^{n-1}$$

$$= \sum_{j=0}^{n-1} \left( b_{j+1} - \sum_{k=0}^{n-1} a_{i+j-n+2} s'_{n-i} \right) X^j$$

is obtained, and coefficients of respective terms of a plaintext polynomial are obtained from $$\phi_s(c) = \Sigma_{j=0}^{n-1}(b_{j+1} - \Sigma_{i=0}^{n-1} a'_{i+j-n+2} s'_{n-i})X_j.$$

Among the obtained coefficients, a coefficient of a constant term is necessary. Therefore, when a coefficient for j=0 is extracted, $$b_1 - \Sigma_{i=0}^{n-1} a'_{i-n+2} s'_{n-i}$$

$$a''_i = a'_{-i+2}$$

is put, the extracted coefficient can be deformed into a decryption function of TLWE encryption as represented by $$b_1 - \Sigma_{i=0}^{n-1} a''_{n-i} s'_{n-i} = b_1 - \Sigma_{i=0}^{n-1} a_i^N s'_i = b_1 - \vec{s'} \cdot \vec{a''} = \phi_{s'}(\vec{a''}, b_1).$$

That is, when coefficients are extracted from the TRLWE ciphertext $A_n = (A(X), B(X))$ obtained by BlindRotate in (1) while the coefficients are set as $$a''_i = \begin{cases} a_1 & (i = 1) \\ -a_{-i+n+2} & \text{(otherwise)} \end{cases},$$

a new TLWE ciphertext $([a''], b_1)$ is obtained which has, as a plaintext, the same value as a constant term of a plaintext polynomial corresponding to the original TRLWE ciphertext $A_n$. This new TLWE ciphertext is the output of SampleExtract and has either of two types of plaintexts, i.e., $-\mu$ or $\mu$.

A trivial ciphertext $([0], \mu)$ of which the plaintext is $\mu$ is added to the thus obtained TLWE ciphertext, thereby obtaining a TLWE ciphertext $cs = ([a''], b1) + ([0], \mu)$.

Specifically, since $\mu = \frac{1}{8}$ in the polynomial F(X) as a test vector, a ciphertext of $-\frac{1}{8}$ or $\frac{1}{8}$ is obtained in this stage.

When the trivial TLWE ciphertext $([0], \frac{1}{8})$ of which the plaintext is $\mu = \frac{1}{8}$ is added to this ciphertext, $$-\frac{1}{8} + \frac{1}{8} = 0$$

$$\frac{1}{8} + \frac{1}{8} = \frac{1}{4}$$

are established, and thus a new TLWE ciphertext cs having either of two values, i.e., 0 or $\frac{1}{4}$ as the plaintext is obtained.

(3) Public Key Switching

The TLWE ciphertext cs obtained in SampleExtract in (2) is encrypted with the private key [s'], not with the private key [s].

Therefore, it is necessary to replace the key of the TLWE ciphertext cs with the private key [s] and return the state of the ciphertext to a state where encryption has been performed with the private key [s], without decrypting the TLWE ciphertext cs.

Therefore, a method of Public Key Switching is described.

The private key [s] for a TLWE ciphertext used in TFHE is an N-th order vector.

By using this vector, the private key [s'] that is an n-th order vector when the Bootstrapping Key has been created is encrypted.

That is, the private key [s'] is encrypted as a value obtained by shifting an element of the circle group {T} to each digit of a real number from 0 to 1 in binary notation, as represented by $$s'_i \times 2^{-1} s'_i \times 2^{-2} s'_i \times 2^{-3}$$

The private key is [s]. The "number of digits" t is a system parameter.

When decryption is performed with the private key [s], $$\phi_s(KS_{i,j}) = s'_i \times 2^{-j}$$

is obtained. This is a "key switching key".

As described above, the TLWE ciphertext cs=([a], b) obtained in (2) is 0 or ¼ obtained by encryption with the private key [s']. The number of elements of [a] is the same as that of the private key [s'] and is n.

When the elements are converted to t-bit fixed-point numbers by one each, the t-bit fixed point numbers can be written in the following form.

$$a_i \approx \Sigma_{j=1}^{t} a_{i,j} \times 2^{-j}$$

Although an error is increased in this stage, the maximum value of the absolute value can be limited by a system parameter.

As main processing of Public Key Switching, the following TLWE ciphertext cx is calculated.

$$cx = (\vec{0}, b) - \Sigma_{i=1}^{n} \Sigma_{j=1}^{t} a_{i,j} \times KS_{i,j}$$

Since the term ([0], b) is a trivial ciphertext, this term is b when being decrypted. A result of decryption of the TLWE ciphertext cx is as follows.

$$\phi_s(cx) = b - \Sigma_{i=1}^{n} \Sigma_{j=1}^{t} a_{i,j} \times s'_i \times 2^{-j} = b - \Sigma_{i=1}^{n} \Sigma_{j=1}^{t} s'_i \times a_{i,j} \times 2^{-j}$$

Since $s'_i$ is a constant for j, it is factored out as follows.

$$= b - \Sigma_{i=1}^{n} s'_i \Sigma_{j=1}^{t} a_{i,j} \times 2^{-j}$$

The expression obtained in decomposition into the fixed-point numbers is then substituted.

$$\approx b - \Sigma_{i=1}^{n} s'_i \times a_i = \phi_{s'}((\vec{a}, b)) = \phi_{s'}(c_s)$$

As a result, $$\phi_s(cx) \approx \phi_{s'}(c_s)$$

is obtained, and key switching is successful.

The TLWE ciphertext cx obtained here is encrypted with the private key [s] that is the same as the private key for the TLWE ciphertext c used as the input of Gate Bootstrapping.

By performing the processing of Public Key Switching, the ciphertext returns to the TLWE ciphertext encrypted with the private key [s], so that its plaintext $\phi_s$ (cx) is 0 when $\phi_s(c)$ is in a range of ±¼, and is ¼ when $\phi_s(c)$ is in a range of ½±¼.

With the processing described above, a TLWE ciphertext is obtained as a result of Gate Bootstrapping, which is either of two values, i.e., 0 or ¼ and has any error within ±¹⁄₁₆.

The maximum value of the error does not depend on the TLWE ciphertext c that is the input, and is a value fixed by a system parameter.

Therefore, the system parameter is set in such a manner that the maximum value of the error is any value within ±¹⁄₁₆ that is the same range as that for a TLWE ciphertext as the input.

This setting enables a NAND operation to be performed any number of times, and enables any operation including addition and multiplication to be performed.

Examples of an error added to the "plaintext" of a TLWE ciphertext output from Gate Bootstrapping include an error added by converting a TLWE ciphertext into an integer, an error added by CMux, and an error when the TLWE ciphertext is converted to a fixed-point number in Public Key Switching. All these errors can be limited by a system parameter, and the system parameter can be adjusted in such a manner that an error for which all things are considered falls within ±¹⁄₁₆.

The processing described above is processing of Gate Bootstrapping in TFHE.

As described above, TFHE is Bit-wise type homomorphic encryption that has zero or non-zero as the plaintext and enables a logical operation to be performed. However, the plaintext is a real number from 0 to 1 associated with the circle group {T}, as described with reference to FIG. 3. Therefore, by associating sections obtained by dividing the circle group {T} with integers in turn, TFHE can be applied as Integer-wise type homomorphic encryption having an integer as the plaintext.

A TLWE ciphertext used in TFHE is described as being an additive homomorphic type for a plaintext on the circle group in the aforementioned paper, and it is obvious that such a TLWE ciphertext enables addition (subtraction) to be performed.

Figure 7:
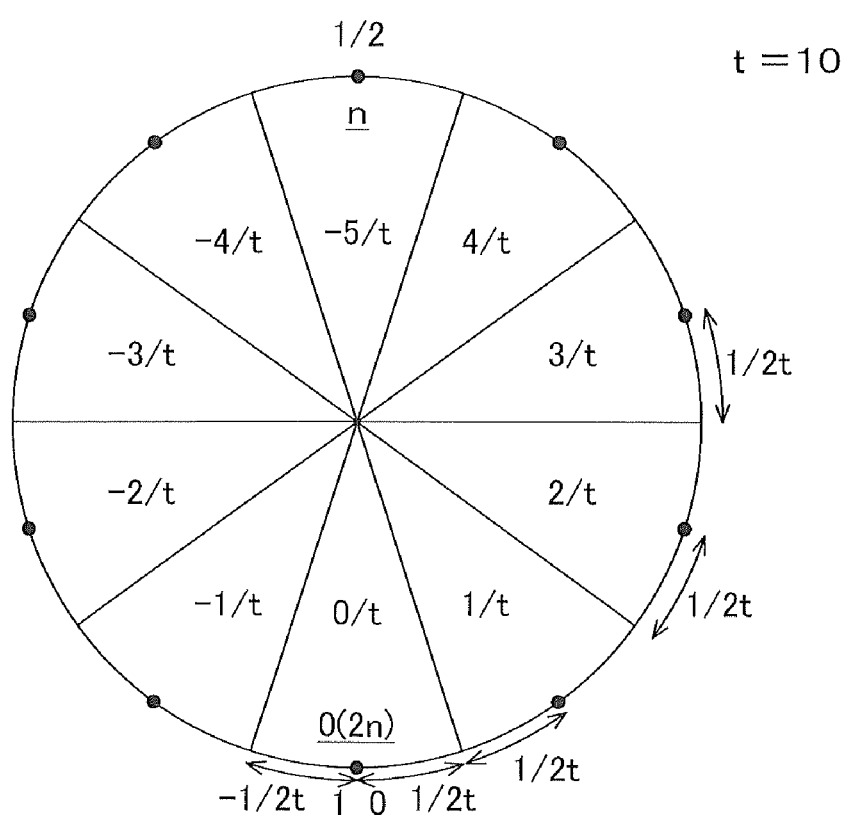
FIG. 7 is an explanatory diagram of TFHE applied to an Integer-wise type.

FIG. 7 is an explanatory diagram of TFHE applied to the Integer-wise type.

As illustrated in FIG. 7, the range from 0 to 1 associated with the circle group {T} is divided into t. For a TLWE ciphertext, possible values of a plaintext are t values obtained by dividing the range from 0 to 1, i.e., from −(t/2) to (t/2)−1, and (t/2)−1 is the maximum value of the integer that can be stored in one TLWE ciphertext.

As exemplified in FIG. 7, when t=10 and the range from 0 to 1 is divided into 10, a ciphertext can express integers of −5, −4, −3, −2, −1, 0, 1, 2, 3, and 4.

In this case, these integer values are respectively assigned to sections of −5/t, −4/t, −3/t, −2/t, −1/t, 0/t, 1/t, 2/t, 3/t, and 4/t that are obtained by dividing the range of 0 to 1 of the circle group {T} into t=10.

With this assignment, integers can be successively assigned counterclockwise from the region including ½.

As illustrated in FIG. 7, 0 (1) on the circle group {T} is within the range of a region from −1/2t to 1/2t. As for a plaintext of a ciphertext on the circle group {T}, an offset based on, for example, 1/2t is added to or subtracted from the state in FIG. 7 as necessary, whereby the position in the region (the position on the circle group {T}) can be adjusted.

In the embodiment described below, the meaning of the number of divisions t of the circle group is different from that in the description related to FIG. 7, although it is essentially unchanged.

Figure 8A:
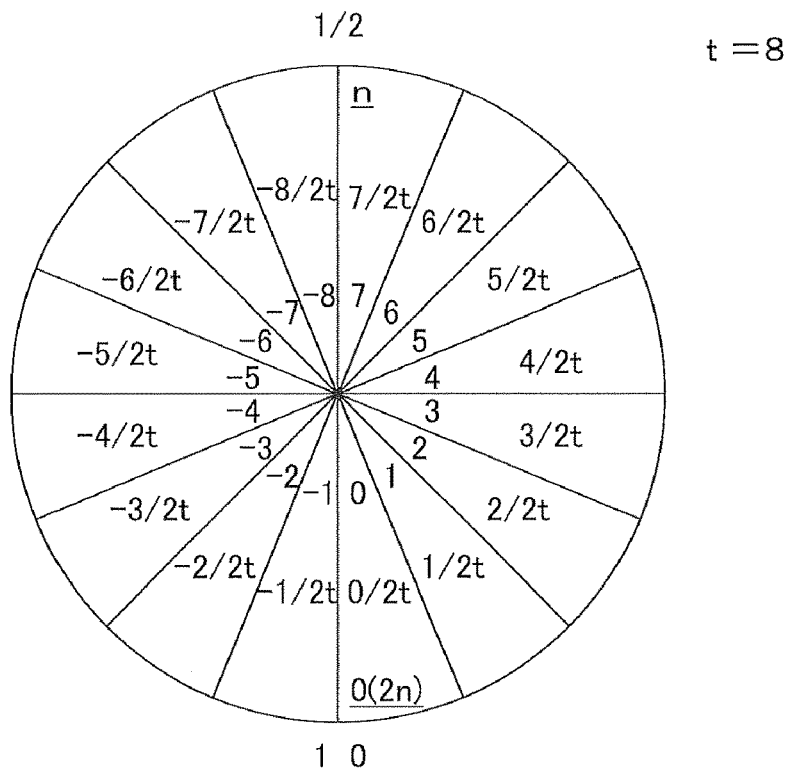
FIGS. 8A and 8B are explanatory diagrams of Integer-wise type TFHE in the present embodiment.
Figure 8B:
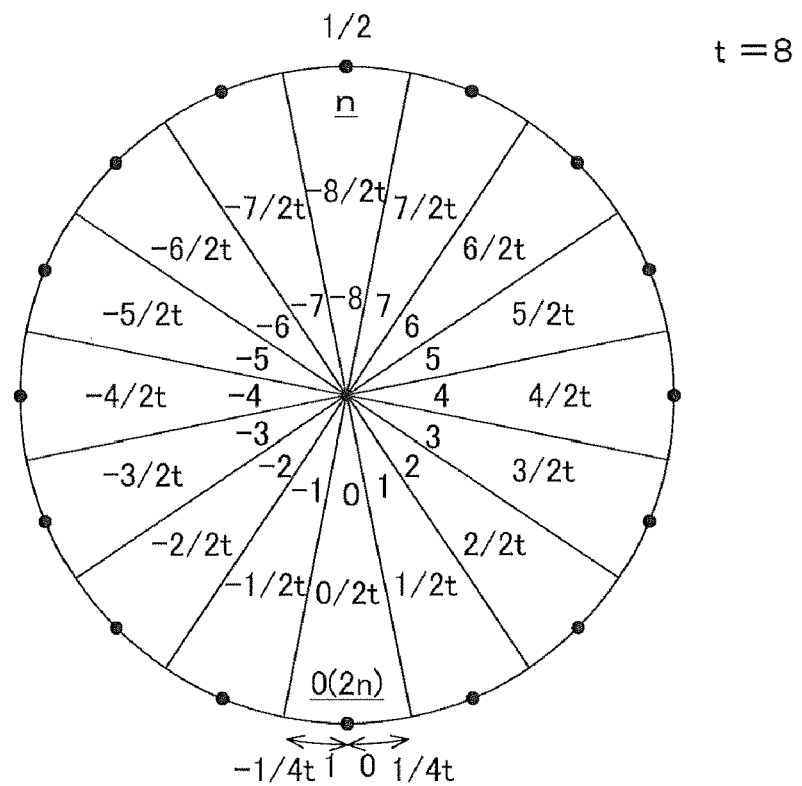
Figure 9:
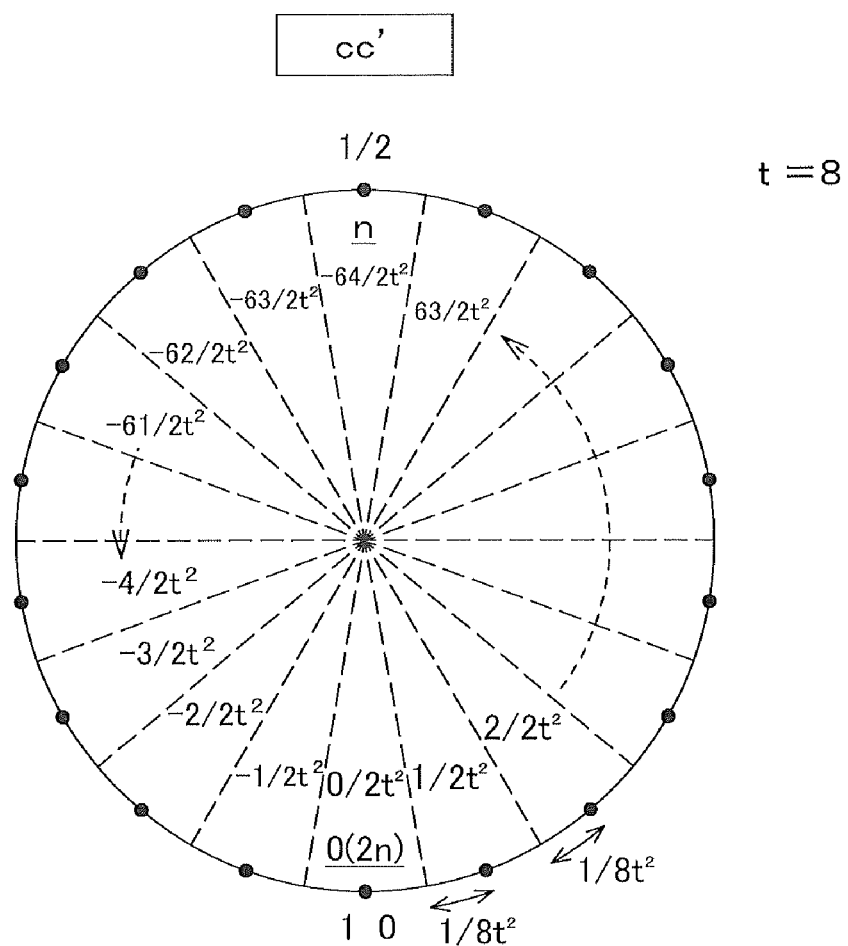
FIG. 9 is an explanatory diagram of Integer-wise type TFHE in the present embodiment.

FIGS. 8A, 8B, and 9 are explanatory diagrams of Integer-wise type TFHE in the present embodiment.

As illustrated in FIGS. 8A and 8B, ciphertexts serving as a devisor and a dividend in the present embodiment each divide the entire range (0 to 1) of the circle group {T} into 2t.

When the value of t is made larger and the circle group {T} is more finely divided, the integer value that can be recorded in a TLWE ciphertext can be made larger. However, when division is performed excessively finely, there is a problem that the range of the error to be added to the plaintext becomes excessively small, which results in decrease in the strength of the encryption. This point will be described later.

An integer value is assigned to each section with a width of $1/(2t)$ obtained by dividing the circle group $\{T\}$, and a range of possible values of a plaintext integer of a TLWE ciphertext is from $-t$ to $t-1$, where $t-1$ is the maximum integer value that can be recorded in one TLWE ciphertext, and $-t$ is the minimum integer value that can be recorded in one TLWE ciphertext.

As in the case of FIG. 5, a state where no offset is added to a plaintext (the offset added to the plaintext is 0) is illustrated in FIG. 8B. FIG. 8A illustrates a state where an offset of, for example, $+1/(4t)$ is added to the plaintext of the ciphertext illustrated in FIG. 8B. By adding the offset, the manner of slicing the circle group $\{T\}$ can be changed.

In the following descriptions, it is assumed that the right half plane and the left half plane of the circle group are based on the state in FIG. 8A where the offset of $1/(4t)$ is added.

In the state where no offset is added in FIG. 8B, 0 (1) on the circle group $\{T\}$ is within the slice from $-1/(4t)$ to $1/(4t)$. By adding the offset, the integer 0 can be associated with the slice $(0/2t)$ starting from 0 on the circle group $\{T\}$ as illustrated in FIG. 8A. Another slice starts from $X/2t$ (where $X$ is a plaintext integer).

In FIG. 8A, the plaintext with the offset added is located at the center of each slice (for example, the slice starting from $3/(2t)$) with an error range of $\pm 1/4t$. At this time, the average of the normal distribution is, for example, $3/(2t)+1/4t$, and plaintexts are distributed within the error range of $\pm 1/4t$, so that the plaintexts are distributed at the center of the slice starting from $3/(2t)$.

Although the plaintext with the offset added is illustrated only in the slice of $3/(2t)$ in FIG. 8A, this illustration is merely an example. A plaintext with the offset added to a value serving as a starting point is present in each slice. This description is also applied to FIG. 7.

The ciphertext in FIGS. 8A and 8B divides the right half plane of the circle group $\{T\}$ into $t$ and the left half plane into $t$. The right half plane of the circle group $\{T\}$ corresponds to 0 and positive plaintext integers (0 to $t-1$).

Integer values are respectively assigned to the slices that are obtained by dividing the range from 0 to 1 ($-1/2$ to $2/1$) of the circle group $\{T\}$ into $2t$ and each start from $-t/(2t)$ to $(t-1)/(2t)$.

These slices are each centered at a value obtained by adding the offset of $+1/(4t)$ to the value serving as the starting point. The offset of $1/(4t)$ corresponds to half of the slice width of $1/(2t)$. When the offset of ¼ is included in the integer representation, it can be represented as an offset of $+0.5$ for convenience.

As illustrated in FIG. 8A, when $2t=16$ ($t=8$) and the range of the circle group is divided into 16, integers from 0 to 7 ($=t-1$) can be expressed by the right half plane of the circle group $\{T\}$, and integers from $-8(=-t)$ to $-1$ can be expressed by the left half plane. That is, the entire ciphertext can express integers of $-8, -7, -6, -5, -4, -3, -2, -1, 0, 1, 2, 3, 4, 5, 6,$ and 7.

These integer values are assigned to sections obtained by dividing the range of the circle group $\{T\}$ into $2t=16$ and starting from $-8/(2t), -7/(2t), -6/(2t), -5/(2t), -4/(2t), -3/(2t), -2/(2t), -1/(2t), 0/(2t), 1/(2t), 2/(2t), 3/(2t), 4/(2t), 5/(2t), 6/(2t),$ and $7/(2t)$, respectively. Integers are successively assigned counterclockwise from the region starting from ½.

The encryption processing device 1 sets a system parameter in TFHE. At this time, the encryption processing device 1 sets the system parameter in such a manner that a range of an error added to a plaintext is less than $\pm 1/(8t^2)$ in a ciphertext obtained after Gate Bootstrapping.

It is assumed that there are a TLWE ciphertext ca as a dividend and a TLWE ciphertext cb as a divisor.

The TLWE ciphertexts ca and cb as the dividend and the divisor are TLWE ciphertexts having the configuration illustrated in FIG. 8A, and each divide the right half plane into $t$ and the entire circle group $\{T\}$ into $2t$.

In the present embodiment, in each of the TLWE ciphertext ca and the TLWE ciphertext cb, the right half plane of the circle group $\{T\}$ is associated with plaintexts that are positive integers.

The TLWE ciphertext ca has a real number $a/(2t)+1/(4t)$ corresponding to the integer $a$ that cannot be known without a private key, as its plaintext.

The TLWE ciphertext cb has a real number $b/(2t)+1/(4t)$ corresponding to the integer $b$ that cannot be known without a private key, as its plaintext.

The fact that the plaintexts of the TLWE ciphertexts ca and cb are $a/(2t)$ and $b/(2t)$, respectively is based on that the entire circle group is divided into $2t$. As described above, the offset of $+1/(4t)$ added to the plaintext makes the slice starting from 0 on the circle group correspond to the integer 0 and also locates the plaintext at the center of the slice.

As described for FIG. 8A, the offset is added to the plaintext in each of the TLWE ciphertext ca and the TLWE ciphertext cb, as represented by $a/(2t)+1/(4t)$ and $b/(2t)+1/(4t)$.

The value of the offset $1/(4t)$ is merely an example, and is not limited thereto. In accordance with the value of the offset, it is necessary to adjust a polynomial and parameters.

In FIG. 8A, on the right half plane of the circle group $\{T\}$, which handles 0 and positive numbers (non-negative numbers), the integers 0 to $t-1$ are expressed by using the slice starting from to the slice starting from $t-1/(2t)$ counterclockwise from bottom.

A method of performing division of ciphertexts is described below with reference to FIGS. 2 and 4. When division becomes possible, TFHE can be used as homomorphic encryption that enables Integer-wise type four arithmetic operations in a more complete form, together with addition and a part of multiplication that are already known. Such TFHE enables more efficient processing as compared with bit-by-bit calculation by Bit-wise type TFHE.

In the method of the present embodiment described below, division is performed (a quotient is obtained) by basically multiplying a dividend by the reciprocal of a divisor and rounding off the lower bits.

Since the encryption processing device 1 performs specific multiplication accompanied by rounding off of lower bits in the process of division between ciphertexts, a method of the specific multiplication is described prior to the description of the division method.

In the specific multiplication method, the encryption processing device 1 performs BlindRotate using a stepped polynomial and, at the same time, performs multiplication between Integer-wise type ciphertexts. In order to obtain a stepped polynomial for BlindRotate, Private Key Switching described in the aforementioned paper (Non-Patent Literature 1) is used as an example in the present embodiment. First, Private Key Switching is described.

A key switching key used in Private Key Switching is described as a key switching key KS1 in order to be distinguished from the key switching key KS used in Public Key Switching.

The result of execution of Private Key Switching using the key switching key KS1 can be defined as $f(c) = \text{TRLWE\_Enc}(f(\text{TLWE\_Dec}(c)))$.

That is, the function f that can calculate a ciphertext, which is obtained by applying the function f to the plaintext obtained by decryption of the TLWE ciphertext c by the encryption processing device 1 and encrypting it by TRLWE encryption, without decryption is Private Key Switching performed using the key switching key KS1. Use of the key switching key KS1 enables a TRLWE ciphertext to be obtained from a TLWE ciphertext.

Since a person who creates the key switching key KS1 knows the private keys [s] and [s'], the person can generate the following key switching key KS1.

$$KS1_{i,j} = \text{TRLWE\_Enc}_{s'}(f(2^{-j} \times s_i))$$

$$KS1_{n+1,j} = \text{TRLWE\_Enc}_{s'}(f(-2^{-j}))$$

A person who performs Private Key Switching, for example, the encryption processing device 1 can perform the following calculation from a TLWE ciphertext $c([a], b)$ by using the key switching key KS1, even if it does not know the private keys [s] and [s'].

Since the key switching key KS1 is essentially a set of TRLWE ciphertexts, the private keys [s] and [s'] cannot be obtained from the key switching key KS1.

Similarly to the case of Public Key Switching described above, the encryption processing device 1 decomposes the respective elements of the TLWE ciphertext as follows.

$$a_i \approx \Sigma_{j=1}^{p} a_{i,j} \times 2_{-j}$$

$$b \approx \Sigma_{j=1}^{p} b_j \times 2^{-1}$$

In the above expressions, $a_{i,j}$ and $b_j$ are values of respective digits when a' orb is expressed in binary, and can be 0 or 1.

The encryption processing device 1 then calculates $$-\Sigma_{j=1}^{p} b_j \times KS1_{n+1,j} - \Sigma_{i=1}^{n} \Sigma_{j=1}^{p} a_{i,j} \times KS1_{i,j}.$$

In order to check what is calculated without a private key, this expression is deformed.

$$-\sum_{j=1}^{p} b_j \times KS1_{n+2,j} - \sum_{k=1}^{n}\sum_{j=1}^{p} a_{i,j} \times KS1_{i,j} = -\sum_{j=1}^{p} b_j \times \text{TRLWE\_Enc}_{s'}\left(f'\left(-2^{-j}\right)\right) - \sum_{k=1}^{n}\sum_{j=1}^{p} a_{i,j} \times \text{TRLWE\_Enc}_{s'}\left(f'\left(-2^{-j} \times s_i\right)\right)$$

$$= \text{TRLWE\_Enc}_{s'}\left(f'\left(\sum_{j=1}^{p} b_j \times 2^{-j}\right)\right) - \text{TRLWE\_Enc}_{s'}\left(f'\left(\sum_{i=1}^{n}\sum_{j=1}^{p} a_{i,j} \times 2^{-j} \times s_i\right)\right)$$

$$\approx \text{TRLWE\_Enc}_{s'}\left(f'^{(b)}\right) - \text{TRLWE\_Enc}_{s'}\left(f'^{\left(\sum_{i=1}^{n} a_i \times s_i\right)}\right)$$

$$= \text{TRLWE\_Enc}_{s'}\left(f'^{\left(b - \sum_{i=1}^{n} a_i \times s_i\right)}\right)$$

$$= \text{TRLWE\_Enc}_{s'}(f'(\text{TRLWE\_Dec}_{s'}(c)))$$

From the above operation result, the TRLWE ciphertext c' in which the plaintext of the TLWE ciphertext is substituted into f is obtained without decrypting the initial TLWE ciphertext c. The function f needs to be a function that causes no problem even if the order of the process of encryption/decryption and the process of evaluating the function f is switched.

In the present embodiment, a function that obtains the following stepped polynomial is set as f(x), and the key switching key KS1 is calculated in advance.

$$f(x) = \times \Sigma_{i=0}^{t-1} i(\Sigma_{j=0}^{n/t-1} X^{n/ti+j})$$

The encryption processing device 1 generates a TRLWE ciphertext having a stepped polynomial as its plaintext from the TLWE ciphertext as the multiplier by using this Private Key Switching. The encryption processing device 1 then implements multiplication by performing BlindRotate by the TLWE ciphertext as the multiplicand for the thus obtained TRLWE ciphertext.

Processes (1) to (6) for performing a multiplication process are described.

In the following descriptions, the TLWE ciphertext cB corresponds to the TLWE ciphertexts cg, cf, cs, and cp by which the TLWE ciphertext ca as a multiplicand is multiplied in multiplication performed in the first, second, and third examples of the present embodiment. In the respective examples, the TLWE ciphertexts cg, cf, cs, and cp are read as the TLWE ciphertext cB as appropriate. The plaintexts g, f, s, and p of the respective TLWE ciphertexts cg, cf, cs, and cp are also read as the plaintext B.

Further, the ciphertexts cc, cc, cd, c1, cu, and cu' obtained in the process of multiplication are ciphertexts that have different values depending on the TLWE ciphertexts cg, cf, cs, and cp serving as multipliers, even when they have the same sign.

(1) The ciphertext cB is a ciphertext that divides the right half plane (0 to 0.5) of a circle group into t=8, and integers from 0 to (t−1) are associated with the right half plane of the circle group divided by t=8. The entire circle group is divided into 2t.

Meanwhile, as for a ciphertext cB', the value of the integer associated with the plaintext is the same as the plaintext B of the ciphertext cB, but the number of divisions is converted from that of the ciphertext cB.

In the ciphertext cB', integers from 0 to (t−1) are associated with the lower half plane of the right half plane (0 to 0.5) of the circle group divided by $t^2=64$. The entire circle group is divided into $2t^2$.

There is also a method in which the TLWE ciphertext cB' (LEVEL1) is obtained by performing BlindRotate for the TLWE ciphertext cB by using the test vector polynomial T(X)

$$T(X) = \sum_{k=0}^{t-1} \left(\frac{k}{2t^2}\right) \sum_{i=0}^{n/t-1} X^{\frac{n}{t}k+1}.$$

Meanwhile, in the present embodiment, a lookup table is prepared which stores therein integers in association with the circle group with a scale of $1/(2t^2)$. Since the TLWE ciphertext cB' is obtained by referring to such a lookup table, Bootstrapping for the ciphertext cB can be omitted.

The number of times of Bootstrapping required for multiplication can be made three times in total including once for the ciphertext cc obtained by Private Key Switching described later (the third bootstrapping) and twice for decomposing the higher and lower bits (the fourth bootstrapping and the fifth bootstrapping).

The encryption processing device 1 (the key exchange unit 38) performs Private Key Switching for the ciphertext cB' by using the key switching key KS to obtain the TRLWE ciphertext cc. The private key of the ciphertext cc is [s'].

When the TRLWE ciphertext cc is decrypted with the private key [s'], the result is as follows.

$$\varphi_{s'}(cc) =$$

$$f'(\varphi_s(cB')) = \varphi_s(cB') \sum_{k=0}^{t-1} i\left(\sum_{j=0}^{n/t-1} X^{\frac{n}{t}i+j}\right) = \frac{B}{2t^2} \sum_{k=0}^{t-1} i\left(\sum_{j=0}^{n/t-1} X^{\frac{n}{t}i+j}\right)$$

The plaintext of the ciphertext cc is a plaintext polynomial $$\frac{B}{2t^2} \sum_{k=0}^{t-1} i\left(\sum_{j=0}^{n/t-1} X^{\frac{n}{t}i+j}\right)$$

which divides the right half plane of the circle group into t (0, 1, 2, 3, . . . ) and in which coefficients increase by the value of the plaintext of the ciphertext cB in a stepwise manner. When the ciphertext cB has 3 as its plaintext, a plaintext polynomial is obtained as a result of Private Key Switching, in which 0, 3, 6, 9, and 12 that are multiples of the plaintext (3) of the ciphertext cB are arranged as coefficients of terms of the respective orders corresponding to the right half plane of the circle group.

(2) The encryption processing device 1 (the third Bootstrapping unit 34) performs BlindRotate using the TLWE ciphertext ca (LEVEL0) for the TRLWE ciphertext cc (LEVEL1) as the third Bootstrapping and then performs SampleExtract, thereby obtaining the ciphertext cc' (LEVEL1). The private key of the ciphertext cc' is [s'].

A TLWE ciphertext ca' obtained by multiplying the TLWE ciphertext ca by 2n has an/t as its plaintext from {a/(2t)}×2n.

Therefore, the term of the plaintext polynomial of $\varphi_{s'}(cc)$, of which the power is close to an/t+n/(2t), is obtained as a constant term.

That is, $\varphi_{s'}(cc')=aB/(2t^2)$, and the ciphertext cc' has aB/$(2t^2)$ as its plaintext. The product of the plaintext a and the plaintext B is obtained, and the ciphertext cc' is a ciphertext corresponding to the product of the plaintext a and the plaintext B.

The ciphertext cc' that is the result of multiplication obtained in the middle, illustrated in FIG. 9, divides the entire range from 0 to 1 into 2t 2=128 in the example of t=8, and the ciphertext can express integers −64, −63, . . . , −4, −3, −2, −1, 0, 1, 2, 3, 4, . . . , 62, and 63.

The right half plane of the circle group can express t 2=64 integers 0, 1, 2, 3, 4, 5, 6, 7, . . . and 63. These integer values are assigned to sections with a width of $1/2t^2$ obtained by dividing the entire range of the circle group from 0 to 1 into $2t^2$.

The ciphertext corresponding to the multiplication result divides the right half plane of the circle group into $t^2$ and the entire circle group into $2t^2$.

When t=8, the right half plane of the circle group is divided into $t^2=64$, so that integers from 0 to 63 can be expressed. The entire circle group is divided into $2t^2=128$.

When t=8, $2^3=8$ and therefore the TLWE ciphertexts ca and cB that are a multiplier and a multiplicand each record a 3-bit integer on the circle group (the right half plane). The result of multiplication between 3-bit integers is a 6-bit integer, and a TLWE ciphertext recording this result therein divides the circle group (the right half plane) into $2^6=64$, i.e., $t^2$.

As described above, the ciphertext of the multiplication result is different from the ciphertexts as the multiplier and the multiplicand in the number of divisions of the circle group.

In the present embodiment, only a part corresponding to a quotient is required from the multiplication result. Therefore, the encryption processing device 1 performs conversion for making the number of divisions of the circle group coincident before and after multiplication between ciphertexts in order to obtain the quotient of the division result.

The encryption processing device 1 extracts lower 3 bits (2t divisions) and higher 3 bits (2t divisions) from, for example, a 6-bit multiplication result ($2t^2$ divisions), thereby obtaining a ciphertext in 2t divisions that is the same as that before multiplication. The higher 3 bits serve as the quotient.

For example, when t=8, the quotient and the remainder of division of the multiplication result by t can be obtained by Bootstrapping for 0 to 63 ($8^2=64$) using each of a sawtooth polynomial (coefficients are 0123 . . . 67012 . . . ) and a stepped polynomial (coefficients are 000011112222 . . . ). However, since it is considered that the optimum order N of a vector used in TFHE is 635 and the optimum order n of the polynomial is 1024, 635 errors of rounding off are accumulated when the 635 coefficients of the TLWE ciphertext are multiplied by 2n immediately before BlindRotate. Further, a section obtained by dividing the order n of the polynomial in accordance with the number of divisions of the section from 0 to 0.5 is a section corresponding to one integer. However, in a case of 64 divisions, each section has a width of 16 only, and therefore an acceptable error is only ±8. Such an error causes a problem that a calculation error rate is too high.

There are options to increase the order n of the polynomial or to make the order N of the vector smaller. However, in either case, the encryption strength or the calculation speed is sacrificed. When the order of the polynomial is increased, the calculation amount of multiplication performed in CMux is increased by $O(n^2)$, whereas when the order of the vector is made smaller, the flexibility of analysis is reduced, enabling encryption to be easily deciphered.

Accordingly, in the present embodiment, calculation of a ciphertext in which the denominator of a plaintext is 2t (a ciphertext of a quotient and a ciphertext of a remainder) from the denominator of the plaintext of $2t^2$ is performed, while the error rate is sufficiently reduced by the following method.

(3) The encryption processing device 1 (the second operation unit 31) converts the ciphertext cc' to a ciphertext in which the denominator of the plaintext is t. First, the ciphertext cc' is multiplied by t. The ciphertext cc' multiplied by t is a multiple of the ciphertext cc', and a multiple of a ciphertext is defined on a circle group as described above. Therefore, the ciphertext cc' multiplied by t is obtained by a conventionally known method. The plaintext of the ciphertext cc' multiplied by t is $aB/(2t^2) \times t = aB/2t$, and the denominator is t.

The encryption processing device 1 (the fourth Bootstrapping unit 35) performs for the ciphertext cc' multiplied by t BlindRotate by a test vector polynomial in which a coefficient μ is set to 1/4 and further performs SampleExtract, thereby obtaining the TLWE ciphertext cd (the private key is [s']). At this point, the private key of the TLWE ciphertext cd is [s'], because Public Key Switching has not been performed yet.

If BlindRotate is simply performed for the TLWE ciphertext cc' that is divided into $t^2$, the ciphertext is broken because of an error of rounding off. For this reason, the ciphertext cc' is multiplied by t as described above.

By multiplying the TLWE ciphertext cc' divided into $t^2$ by t and performing processing while regarding it as a ciphertext divided into t, the width on the circle group of a value corresponding to an integer symbol is enlarged from a range of $1/2t^2$ in FIG. 9 to 1/2t in FIG. 6A, which is t times larger.

Therefore, the interval between plaintexts (the error range) on the circle group can be sufficiently widened, so that the error caused by rounding off is suppressed within an acceptable range, and an error rate in BlindRotate can be sufficiently lowered.

As a result of multiplying the ciphertext cc' by t, the plaintext that has used the section from 0 to 0.5 (the right half plane) of the circle group is also distributed in the section from 0.5 to 1 in the TLWE ciphertext cd. The TLWE ciphertext cd has 1/4 as its plaintext in the section from 0 to 0.5 (the right half plane) of the circle group, and has −1/4 as its plaintext in the section from 0.5 to 1 (the left half plane).

(4) The encryption processing device 1 (the third operation unit 32) calculates cc'×t+cd−(0, 1/4). The encryption processing device 1 (the fourth Bootstrapping unit 35) performs Public Key Switching for the result of that calculation to obtain the TLWE ciphertext c1 of which the private key is [s]. The lower bits of the multiplication result are thus obtained.

The TLWE ciphertext c1 is a ciphertext that becomes $\varphi^s$ (c1)=(aB mod t)/(2t)+1/(4t) when being decrypted.

Considering that the remainder is always positive, the plaintext of the ciphertext c1 is positive even if the plaintext of the ciphertext cc' is negative. When calculation is performed up to the quotient, t×quotient+remainder=ab is satisfied regardless of whether it is positive or negative, so that there is no mathematical contradiction. When the multiplication result is obtained from a state where it is stored in one variable by using a division remainder calculation instruction in a computer, the result is completely coincident with a process of decomposing the multiplication result by a shift operation and an AND operation with t being a power of 2, that is, a process of simply dividing bits in binary notation, although it varies depending on a language processing system and a CPU architecture.

Since calculation is performed using the TLWE ciphertext multiplied by t, the width of the value corresponding to one integer symbol is widened to be t times larger, so that the error caused by rounding off can be accepted relatively. Further, since addition and multiplication are performed by a TLWE ciphertext with the private key [s'], the influence of Public Key Switching that adds a relatively large error can be made small.

In order to obtain the higher bits of the multiplication result, the following operation is performed.

(5) The encryption processing device 1 (the fifth Bootstrapping unit 36) performs BlindRotate and SampleExtract for the TLWE ciphertext c1 of the lower bits by using the test vector polynomial $$T(X) = \sum_{k=0}^{t-1} \frac{k}{2t^2} \sum_{l=0}^{n/t-1} X^{\frac{n}{t}k+1},$$

thereby obtaining the TLWE ciphertext c1' (LEVEL1). The private key of the TLWE ciphertext c1' is [s'].

The TLWE ciphertext c1' is a ciphertext in which the denominator of the plaintext is $1/2t^2$ and which retains the lower bits (aB mod t) of the multiplication result by using the section from 0 to 1/(2t). Since it is assumed that the remainder is not a negative number, it is considered that only the right half plane of the circle group is used.

(6) The encryption processing device 1 (the fourth operation unit 33) calculates cu=cc'−c1'+(0, 1/4t) to obtain the ciphertext cu.

Public Key Switching is performed for the ciphertext cu, and the private key is returned from [s'] to [s], so that the ciphertext cu' is obtained. That is, by subtracting (aB mod t)/$2t^2$ from aB/$2t^2$, the numerator is made a multiple of t, and the numerator and denominator are reduced by t.

Then, $$\varphi_s(cu') = aB - (aB \bmod t)/2t^2 + \frac{1}{4t} = \left\lfloor \frac{aB}{t} \right\rfloor \Big/ 2t + \frac{1}{4t}$$

is obtained.

At this time, since the error components added to the plaintexts of the ciphertext cc' and the ciphertext c1' follow the normal distribution, the error added to the plaintext of the ciphertext cu also follows the normal distribution due to the reproducibility. Therefore, the ciphertext cu' can be used for the next operation as it is.

That is, by subtracting a ciphertext that is the remainder of 8 from a ciphertext dividing the right half plane into 64, a ciphertext having a multiple of 8 as its plaintext is always obtained. That is, every eight blocks are used. When being compared with a ciphertext dividing the right half plane into eight, this ciphertext can be regarded as being the same in the dividing manner but being different only in the variance of errors applied thereto. Therefore, the ciphertext cu can be substantially treated as a ciphertext dividing the right half plane into eight.

This is because the error components added to the plaintexts of the ciphertext cc' and the ciphertext c1' follow the normal distribution. The error added to the plaintext of the ciphertext cu obtained by ciphertext cc'-ciphertext c1' also follows the normal distribution because of the property called reproducibility. Therefore, the ciphertext cu' that is the higher digits (bits) of multiplication can be used in the next operation without being subjected to Bootstrapping.

Both the ciphertext cu' and the ciphertext c1 are at LEVEL0 obtained by returning the private key to [s] by Public Key Switching finally. By eliminating this process and performing Public Key Switching for each of the ciphertext ca and the ciphertext cb in the pre-processing, both input and output are made LEVEL1.

First Example

With reference to FIGS. 1 to 4, a method of dividing the TLWE ciphertext ca of the integer a as a dividend by the ciphertext cb of the integer b as a divisor is described as a first example. This first example corresponds to the configuration in FIGS. 3A to 3D.

As described with reference to FIGS. 8A and 8B, the maximum integer that can be included in a TLWE ciphertext is t−1, the dividend a can be from 0 to t−1, and the divisor b can be from 1 to t−1. The divisor cannot be 0.

The encryption processing device 1 performs division between ciphertexts by multiplying a ciphertext as a dividend by a ciphertext as the reciprocal of a divisor and obtaining a division result (quotient) from the multiplication result with only the higher bits left.

The result (quotient) of division of the dividend a by the divisor b is obtained by the following expression.

$$z = \left\lfloor \frac{a}{b} \right\rfloor$$

As described with reference to FIGS. 8A and 8B, the division result z that can be expressed by a TLWE ciphertext is an integer of which the maximum value is t−1.

In the expression for obtaining z, the right side $$\left\lfloor \frac{a}{b} \right\rfloor$$

is deformed by using the above-described maximum value (t−1) of the integer. Then, $$z = \left\lfloor a \times \frac{t^2/b}{t} \right\rfloor = \left\lfloor \frac{a \times \left(\frac{t^2/b}{t}\right) + \left(a \times \frac{t^2/b}{t} \bmod 1\right)}{t} \right\rfloor =$$

$$\left\lfloor \frac{a \times \left(\frac{t^2/b}{t}\right) + \left(a \times \frac{t^2/b}{t} \bmod t\right)}{t} \right\rfloor$$

(Expression 1)

is obtained.

Here, functions $$\left\lfloor \frac{t^2/x}{t} \right\rfloor, t^2/x \bmod t$$

related to the divisor b in Expression 1 are put as follows.

$$f(x) = \left\lfloor \frac{t^2/x}{t} \right\rfloor$$

$$g(x) = t^2/x \bmod t$$

The value of t that is the number of divisions of a ciphertext is determined by a system parameter, and the divisor b that is an argument of the functions f(X) and g(X) is a limited number of integers between 0 to t−1, inclusive (0, 1, 3, 4, 5, 6, and 7 when t is 8). However, since the divisor cannot be 0, 0 is excluded as the value of the divisor b actually.

The encryption processing device 1 calculates $$f(x) = \left\lfloor \frac{t^2/x}{t} \right\rfloor$$

$$g(x) = t^2/x \bmod t$$

in advance for each of values of x (the values of the divisor b) from 1 to t−1, and creates a table in which the calculation result is associated with each value of x as follows.

TABLE 1

| | x | | | | | | | |
|---|---|---|---|---|---|---|---|---|
| | 0 | 1 | 2 | 3 | 4 | 5 | 6 | 7 |
| f(x) | — | 7 | 4 | 2 | 2 | 1 | 1 | 1 |

TABLE 2

| | x | | | | | | | |
|---|---|---|---|---|---|---|---|---|
| | 0 | 1 | 2 | 3 | 4 | 5 | 6 | 7 |
| g(x) | — | 7 | 0 | 5 | 0 | 4 | 2 | 1 |

The calculation result f of f(x) corresponds to the reciprocal of the divisor b, and the calculation result g of g(x) corresponds to an error adjustment value for the division result.

Expression 1 can be deformed as $$z = \left\lfloor \frac{a \times f(b) + \left\lfloor \frac{a \times g(b)}{t} \right\rfloor + 1}{t} \right\rfloor \quad \text{(Expression 2)}$$

by using f(x) and g(x) described above.

For the ciphertext cc' in the middle of multiplication, which can hold an integer up to $t^2-1$, homomorphic addition can be performed. Therefore, when the ciphertext cu' of the higher bits of the result of multiplication between the ciphertext ca and the ciphertext cb in accordance with FIG. 4 is written by a numerical expression, that expression is equivalent to evaluation of the following function m.

$$m(a, b, c) = \left\lfloor \frac{a \times b + c}{L} \right\rfloor$$

When the function m is used, the above Expression 2 can be expressed as $$z = m(a, f(b), m(a, g(b), 0) + 1). \quad \text{(Expression 3)}$$

As described above, the values of f(b) and g(b) are tabulated in association with the value of the divisor b. The encryption processing device 1 performs Gate Bootstrapping using a test vector created based on these tables and performs division for obtaining the quotient z.

Specifically, the encryption processing device 1 inputs the TLWE ciphertext cb to the first Bootstrapping unit 12, performs the first Bootstrapping by a test vector created from the above Table 1, and obtains the ciphertext cf having the reciprocal f of the divisor b as its plaintext, as illustrated in FIG. 3A.

Further, the encryption processing device 1 inputs the TLWE ciphertext cb to the second Bootstrapping unit 13, performs the second Bootstrapping by a test vector created from the above Table 2 for the function g(b), and obtains the ciphertext cg having the error adjustment value g as its plaintext, as illustrated in FIG. 3B.

As a result, Expression 3 can be expressed as $$z = m(a, f, m(a, g, 0) + 1).$$

The encryption processing device 1 has performed BlindRotate for the TLWE ciphertext cb twice up to this point.

Next, the encryption processing device 1 calculates the function m(a, g, 0) in Expression 3. From $$m(a, g, 0) = \left\lfloor \frac{a \times g + 0}{t} \right\rfloor,$$

the encryption processing device 1 calculates $$\left\lfloor \frac{a \times g + 0}{t} \right\rfloor$$

as illustrated in FIG. 3C. The encryption processing device 1 performs multiplication of the ciphertext ca and the ciphertext cg in accordance with FIG. 4. The encryption processing device 1 adds 0 to the ciphertext cc' in a homomorphic manner and obtains the ciphertext cu' as higher bits of the result of the addition. The thus obtained ciphertext is the ciphertext ch having an error adjustment value h as its plaintext.

The encryption processing device 1 performs BlindRotate three times in the operation for obtaining the ciphertext ch. As a result, Expression 3 can be expressed as $$z = m(a, f, h+1). \quad \text{(Expression 3')}$$

From $$m(a, f, h+1) = \left\lfloor \frac{a \times f + h + 1}{t} \right\rfloor,$$

the encryption processing device 1 calculates $$\left\lfloor \frac{a \times f + h + 1}{t} \right\rfloor$$

as illustrated in FIG. 3D.

The encryption processing device 1 performs multiplication of the ciphertext ca and the ciphertext cf in accordance with FIG. 4. The encryption processing device 1 adds the ciphertext ch and 1 to the ciphertext cc' in a homomorphic manner and obtains a ciphertext cu' as higher bits of the result of the addition. The thus obtained ciphertext is the ciphertext cz having the result of division (quotient) z as its plaintext.

The encryption processing device 1 performs BlindRotate three times in the operation for obtaining the ciphertext cz.

According to this method, the encryption processing device 1 was able to perform division by performing BlindRotate eight times in total for 3-bit, 4-bit, and 5-bit Integerwise type ciphertexts. The required time is about 365 ms. As compared with 719 ms when table look up is performed by the above-described Tree PBS (Non-Patent Literature 3), the speed was able to be largely increased.

By using multiplication in which lower bits are rounded down (using decomposition into higher and lower bits after multiplication, as a shift operation) and performing multiplication processing twice, reciprocal multiplication is performed for n-bit (3-bit in the above description) wide plaintext with 2n-bit (6-bit in the above description) wide precision. Accordingly, the division result that exactly matches with the integer precision is obtained.

Second Example (3 Bit)

Figure 10:
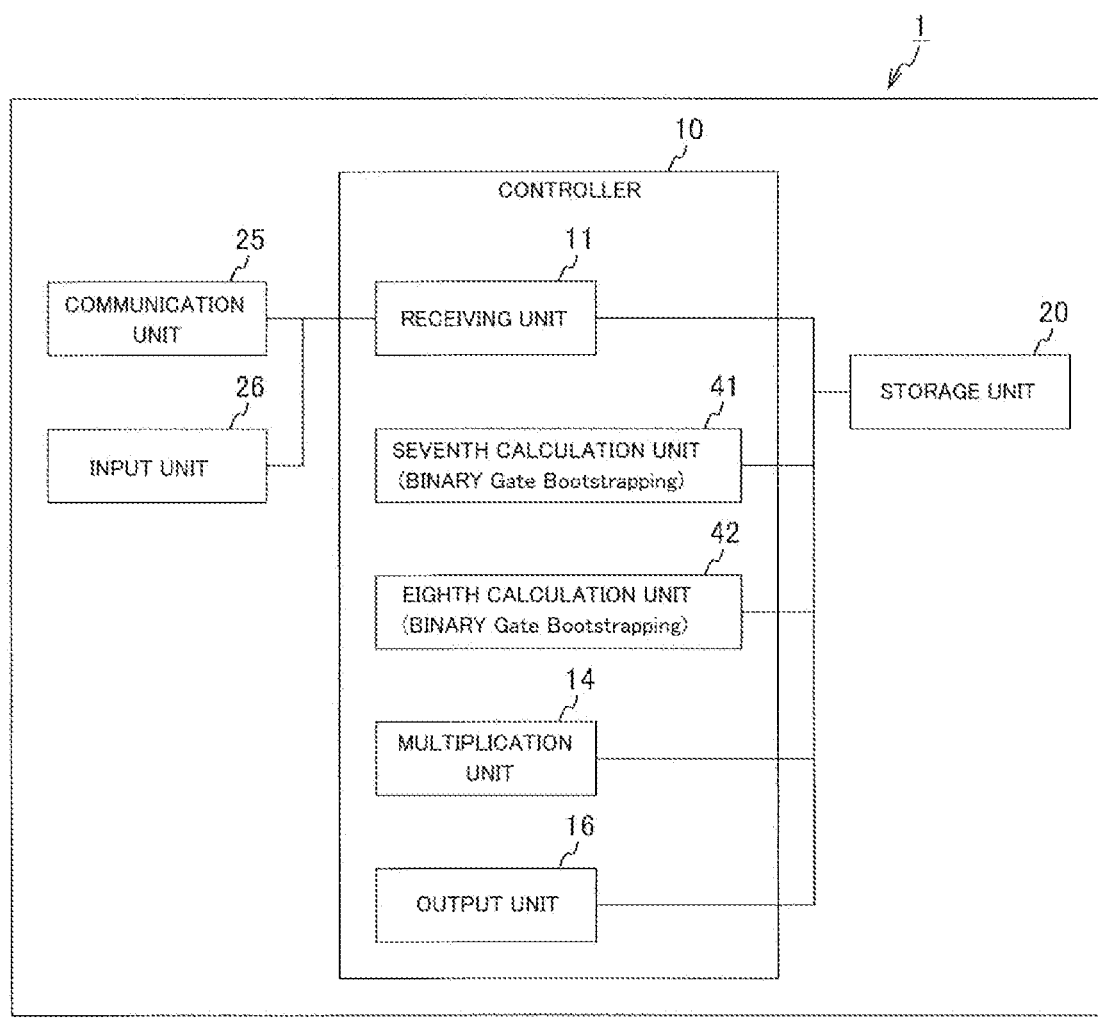
FIG. 10 is an explanatory diagram of a functional configuration of an encryption processing device that speeds up, in particular, division between 3-bit ciphertexts.

FIG. 10 is an explanatory diagram of a functional configuration of an encryption processing device that speeds up, in particular, division between 3-bit ciphertexts.

An identical configuration to that illustrated in FIG. 1 is denoted by the same reference sign, and the description thereof is omitted.

The controller 10 of the encryption processing device illustrated in FIG. 10 includes the receiving unit 11, a seventh Bootstrapping unit 41, an eighth Bootstrapping unit 42, the multiplication unit 14, and the output unit 16.

Figure 11A:
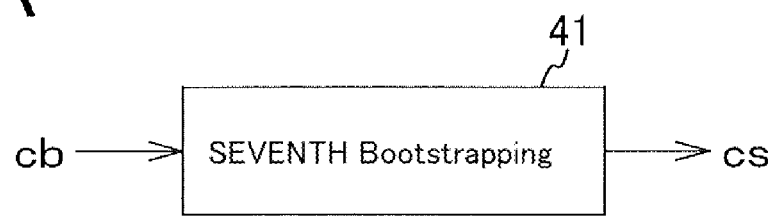
FIGS. 11A, 11B, and 11C are explanatory diagrams of an operation process based on the functional configuration in FIG. 10.
Figure 11B:
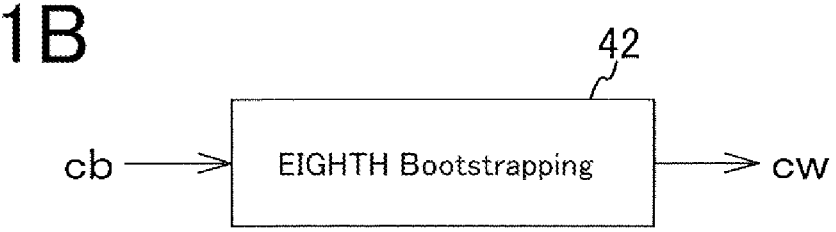
Figure 11C:
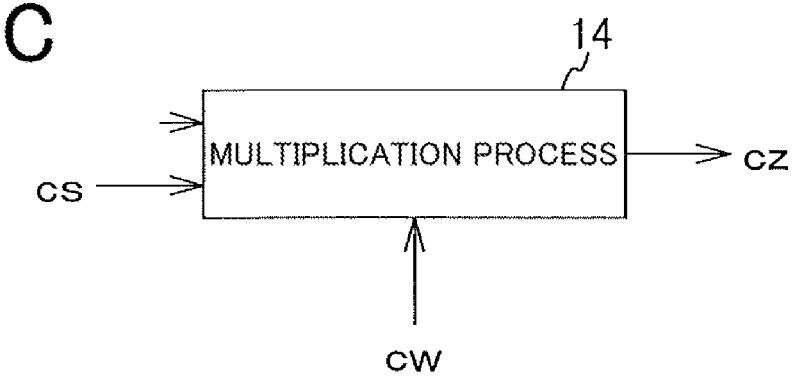

FIGS. 11A to 11C are explanatory diagrams of an operation process based on the functional configuration in FIG. 10.

As illustrated in FIG. 11A, the encryption processing device 1 inputs the TLWE ciphertext cb to the seventh Bootstrapping unit 41 and performs the seventh Bootstrapping, thereby obtaining a TLWE ciphertext cs having a reciprocal s of the divisor b as its plaintext. The seventh Bootstrapping is performed by using a test vector created from a table described later.

As illustrated in FIG. 11B, the encryption processing device 1 inputs the TLWE ciphertext cb to the eighth Bootstrapping unit 42 and performs the eighth Bootstrapping, thereby obtaining a TLWE ciphertext cw having an error adjustment value w for the divisor b as its plaintext. The eighth Bootstrapping is performed by using a test vector created from a table described later.

As illustrated in FIG. 11C, the encryption processing device 1 inputs the TLWE ciphertext ca and the TLWE ciphertext cs to the multiplication unit 14 and performs multiplication. The encryption processing device 1 adds the ciphertext cw of the error adjustment value to the ciphertext cc' in a homomorphic manner and obtains the ciphertext cu' as the higher bits of the result of the addition. The thus obtained ciphertext is the TLWE ciphertext cz having the division result (quotient) z as its plaintext. The second example is described in detail by way of FIGS. 2, 4, 10, and 11A to 11C.

As described with reference to FIGS. 8A and 8B, the maximum integer that can be included in a TLWE ciphertext is t−1. The dividend a can be from 0 to t−1, and the divisor b can be from 1 to t−1 (the divisor cannot be 0).

Here, t=8, and the dividend is an integer from 0 to 7 that can be expressed by 3 bits. Since the divisor cannot be 0, 0 is excluded as the value of the divisor b actually. The divisor b is an integer from 1 to 7.

From the above $$m(a, b, c) = \left\lfloor \frac{a \times b + c}{t} \right\rfloor,$$

an expression of the quotient z is written as $$z = m(a, s[b], w[b]). \quad \text{(Expression 4)}$$

s[b] and w[b] are tables created by calculating the reciprocal s and the error adjustment value w in advance when the divisor b is any of integers from 1 to 7 and associating them with the value of the divisor b. In this 3-bit case, the error adjustment value can be expressed by the table of w[b]. Even when the error adjustment value is determined by the divisor b only, an operation can be performed with integer precision.

TABLE s[b]

| | b | | | | | | | |
|---|---|---|---|---|---|---|---|---|
| | 0 | 1 | 2 | 3 | 4 | 5 | 6 | 7 |
| s(b) | — | 7 | 4 | 3 | 2 | 1 | 1 | 1 |

TABLE w[b]

| | b | | | | | | | |
|---|---|---|---|---|---|---|---|---|
| | 0 | 1 | 2 | 3 | 4 | 5 | 6 | 7 |
| w(b) | — | 7 | 0 | 0 | 0 | 3 | 2 | 1 |

In the second example, the encryption processing device 1 performs division by using these tables s[b] and w[b].

Two 3-bit tables are prepared instead of a 6-bit table when 3-bit division is performed, unlike Tree PBS in Non-Patent Literature 3. Accordingly, the table capacity can be reduced, and the number of times of BlindRotate can be reduced.

Specifically, the encryption processing device 1 performs the seventh Bootstrapping by a test vector $T_s(X)$ created from Table s[b] for the TLWE ciphertext cb, and obtains a TLWE ciphertext cs having the reciprocal s of the divisor b as its plaintext, as illustrated in FIG. 11A, where s/t is a value approximating the reciprocal of the divisor b.

Next, the encryption processing device 1 performs the eighth Bootstrapping by a test vector $T_w(X)$ created from Table w[b], and obtains the TLWE ciphertext cw corresponding to the error adjustment value w by multiplication by the reciprocal of the divisor b, as illustrated in FIG. 11B.

As a result, Expression 4 can be expressed as $$z = m(a, s, w).$$

The encryption processing device 1 performs BlindRotate for the TLWE ciphertext cb twice up to this point. From (3)

$$m(a, s, w) = \left\lfloor \frac{a \times s + w}{t} \right\rfloor,$$

the encryption processing device 1 can calculate $$\left\lfloor \frac{a \times s + w}{t} \right\rfloor$$

to obtain the quotient z.

The encryption processing device 1 performs multiplication of the TLWE ciphertext ca and the TLWE ciphertext cs in accordance with FIG. 4. The encryption processing device 1 adds the TLWE ciphertext cw to the ciphertext cc' in a homomorphic manner and obtains the ciphertext cu' as the higher bits of the result of the addition. The thus obtained ciphertext is the TLWE ciphertext cz having the division result (quotient) z as its plaintext.

Since the division result has been obtained in the form of as+w precisely, this result can be used.

The encryption processing device 1 performs BlindRotate three times in the operation for obtaining the TLWE ciphertext cz.

As described above, BlindRotate is performed five times in total, and the required time is about 227 ms. The time required for one division was able to be further reduced as compared with that in the first example, although this result is limited to a case where the divisor and the dividend are 3-bit integers.

Third Example (4 Bit)

Figure 12:
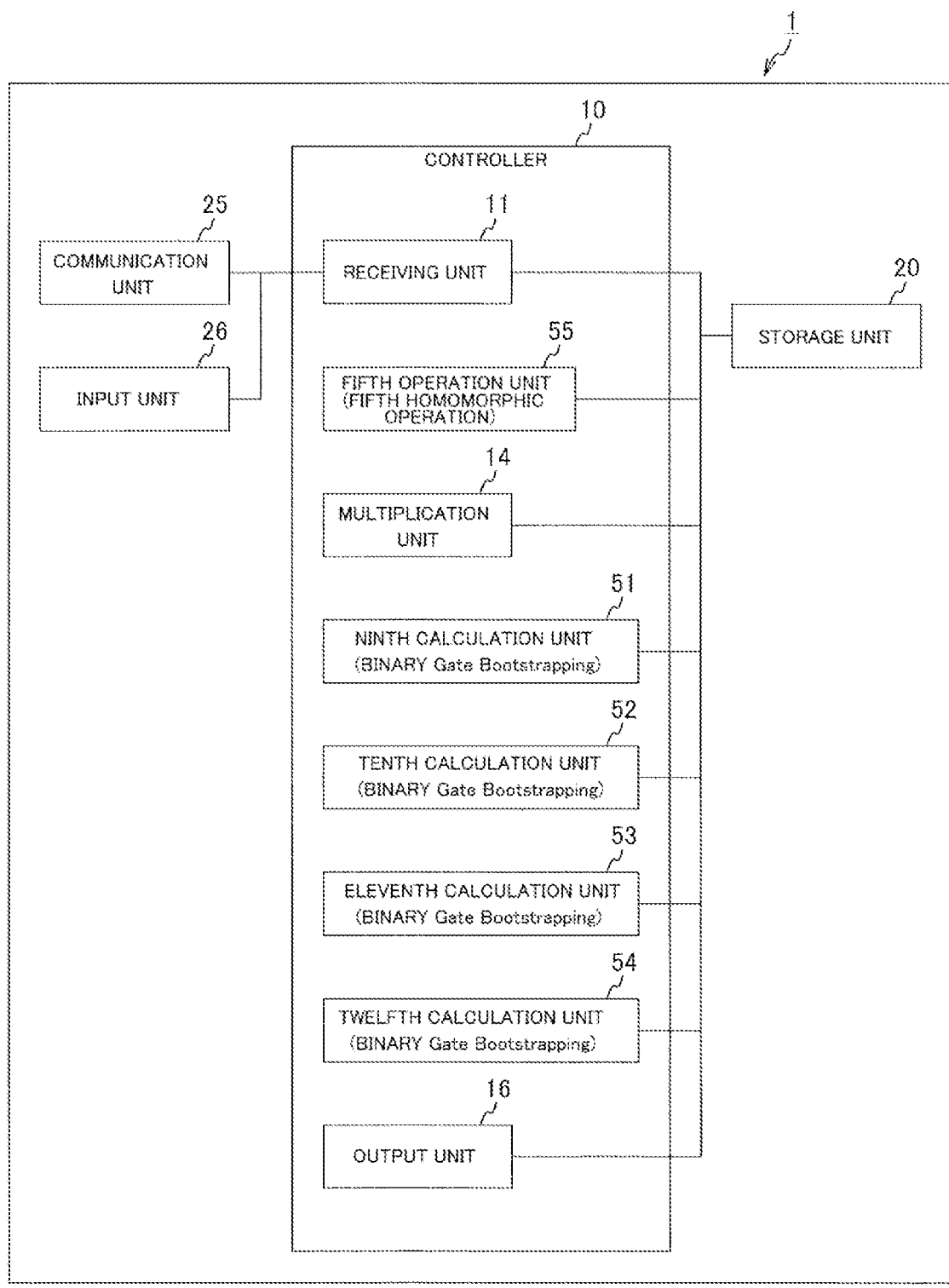
FIG. 12 is an explanatory diagram of a functional configuration of an encryption processing device that speeds up, in particular, division between 4-bit ciphertexts.

FIG. 12 is an explanatory diagram of a functional configuration of an encryption processing device that speeds up, in particular, division between 4-bit ciphertexts.

An identical configuration to that illustrated in FIG. 1 is denoted by the same reference sign, and the description thereof is omitted.

The controller 10 of the encryption processing device 1 includes the receiving unit 11, a ninth Bootstrapping unit 51, a tenth Bootstrapping unit 52, an eleventh Bootstrapping unit 53, a twelfth Bootstrapping unit 54, a fifth operation unit 55, the multiplication unit 14, and the output unit 16.

FIGS. 13A to 13F are explanatory diagrams of an operation process based on the functional configuration in FIG. 12.

Figure 13A:
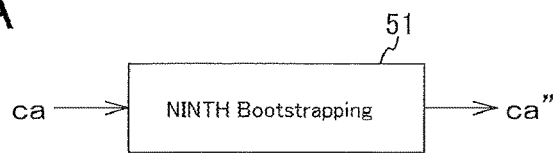
FIGS. 13A, 13B, 13C, 13D, 13E, and 13F are explanatory diagrams of an operation process based on the functional configuration in FIG. 12.

As illustrated in FIG. 13A, the encryption processing device 1 inputs the TLWE ciphertext ca to the ninth Bootstrapping unit 51 and performs the ninth Bootstrapping, thereby obtaining a TLWE ciphertext ca" having a" as its plaintext.

Figure 13B:
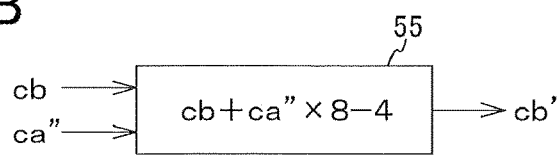

As illustrated in FIG. 13B, the encryption processing device 1 inputs the TLWE ciphertext ca" and the TLWE ciphertext cb to the fifth operation unit 55 and performs a homomorphic operation, thereby obtaining a TLWE ciphertext cb' having b' as its plaintext.

Figure 13C:
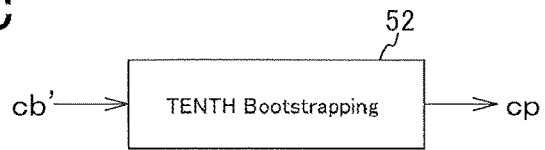

As illustrated in FIG. 13C, the encryption processing device 1 inputs the TLWE ciphertext cb' to the tenth Bootstrapping unit 52, performs the tenth Bootstrapping using a test vector created from a table described later, and multiplies the result by the TLWE ciphertext ca", thereby obtaining a TLWE ciphertext cp having p as its plaintext.

Figure 13D:
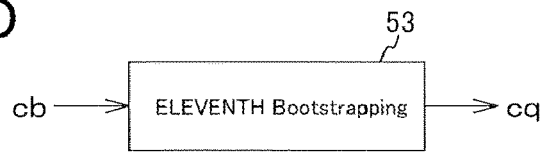

As illustrated in FIG. 13D, the encryption processing device 1 inputs the TLWE ciphertext cb to the eleventh Bootstrapping unit 53 and performs the eleventh Bootstrapping using a test vector created from a table described later, thereby obtaining a TLWE ciphertext cq having q as its plaintext.

Figure 13E:
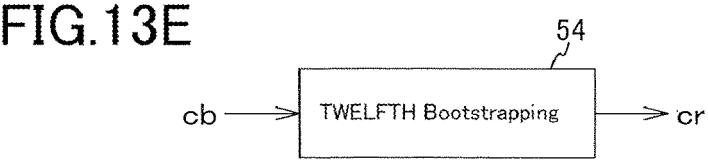

As illustrated in FIG. 13E, the encryption processing device 1 inputs the TLWE ciphertext cb to the twelfth Bootstrapping unit 54 and performs the twelfth Bootstrapping using a test vector created from a table described later, thereby obtaining a TLWE ciphertext cr having r as its plaintext.

Figure 13F:
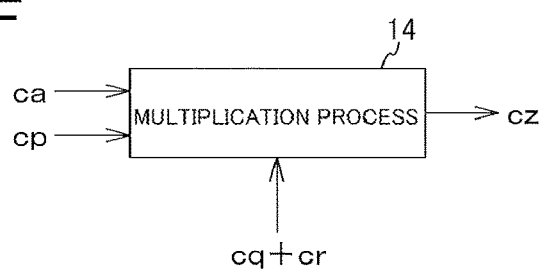

As illustrated in FIG. 13F, the encryption processing device 1 inputs the TLWE ciphertext ca and the TLWE ciphertext cs to the multiplication unit 14 and performs multiplication. The encryption processing device 1 adds the result of the homomorphic operation of the TLWE ciphertext cp and the TLWE ciphertext cr, which is an error adjustment value, to the ciphertext cc' in a homomorphic manner and obtains the ciphertext cu' as the higher bits of the result of the addition. The thus obtained ciphertext is the TLWE ciphertext cz having the division result (quotient) z as its plaintext.

The third example is described in detail by way of FIGS. 2, 4, 12, and 13A to 13F.

As described with reference to FIGS. 8A and 8B, the maximum integer that can be contained in a TLWE ciphertext is t−1. Since the divisor cannot be 0 although the dividend a can by a value from to t−1, 0 is excluded as the value of the divisor b actually. The divisor b can be a value from 1 to t−1.

Here, t=16, and the dividend a is an integer in a range from 0 to 15 that can be expressed by 4 bits. The divisor b is an integer in a range from 1 to 15.

When the procedure that is the same as that in the second example is used, an error is large, and an exact match table cannot be created. The encryption processing device 1 performs Gate Bootstrapping using a test vector based on Table $t[a]=[1,1,1,1,1,1,1,1,-1,-1,-1,-1,-1,-1,-1,-1]$ for the TLWE ciphertext ca, and prepares the TLWE ciphertext ca" of which if the dividend a is 8 or less, the plaintext a" is −1, and otherwise, the plaintext a" is 1.

The encryption processing device 1 deforms Expression 3 to $$z=m(a,p[b],a''\times q[b']+r[b]+1).$$ (Expression 5)

In Expression 5, p[b], q[b], and r[b] are tables created by calculating p, q, and r in advance when the divisor b is any of integers from 0 to 15 and associating them with the value of the divisor b.

TABLE t[a]

| | a | | | | | | | |
|---|---|---|---|---|---|---|---|---|
| | 0 | 1 | 2 | 3 | 4 | 5 | 6 | 7 |
| t(a) | −1 | −1 | −1 | −1 | −1 | −1 | −1 | −1 |
| | a | | | | | | | |
| | 8 | 9 | 10 | 11 | 12 | 13 | 14 | 15 |
| t(a) | −1 | 1 | 1 | 1 | 1 | 1 | 1 | 1 |

TABLE p[b]

| | b | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| p(b) | — | 15 | 8 | 5 | 4 | 3 | 2 | 2 | 2 | 1 | 1 | 1 | 1 | 1 | 1 | 1 |

TABLE q[b']

| | b' | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| p(b') | — | 4 | 0 | 1 | 0 | 1 | 2 | 1 | 0 | 1 | 0 | 1 | 0 | 0 | 0 | 0 |

TABLE r[b]

| | b | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| r(b) | — | 11 | 0 | 4 | 0 | 2 | 6 | 3 | 0 | 7 | 5 | 3 | 3 | 2 | 1 | 0 |

In the third example, the encryption processing device 1 performs division by using these tables p[b], q[b'], and r[b].

Since three 4-bit tables are prepared instead of an 8-bit table when 4-bit division is performed, the table capacity can be reduced, and the number of times of BlindRotate can be reduced.

Specifically, the encryption processing device 1 performs, for the TLWE ciphertext ca, the ninth Gate Bootstrapping by a test vector $T_a(X)$ based on Table t[a] to obtain the TLWE ciphertext ca".

The ciphertext ca" has −1 as its plaintext a" when the dividend a is 8 or less, and has 1 as its plaintext a" otherwise.

The encryption processing device 1 performs a homomorphic operation corresponding to b+a"×8−4 and obtains the TLWE ciphertext cb'. a"×8 is ¼ or −1/4 on the circle group, and the TLWE ciphertext cb' has a value obtained by rotating this resultant by 1/4 turn and then adding it to b, as its plaintext. In the TLWE ciphertext cb', the plaintext b' remains on the right half plane of the circle group when the dividend a is 8 or less, and makes a half turn to the left half plane when the dividend a is 9 or more.

The encryption processing device 1 performs the eleventh Bootstrapping by a test vector $T_q(X)$ created from Table q[b] for the ciphertext cb', thereby obtaining the TLWE ciphertext cq having an error adjustment value q as its plaintext, multiplied by the TLWE ciphertext ca" (the plaintext a" is −1 or 1).

The present embodiment is characterized by performing BlindRotate using the ciphertext cb' obtained by adding 0 or 1/2 to the ciphertext cb in the eleventh Bootstrapping. Thus, multiplication by the TLWE ciphertext ca" (the plaintext a" is −1 or 1) can be performed simultaneously with BlindRotate.

The method of performing multiplication by the ciphertext ca" after the eleventh Bootstrapping, which performs table lookup, further requires BlindRotate.

In that case, it is necessary to perform multiplication by the TLWE ciphertext ca" (the plaintext a" is −1 or 1), considering the plaintext of the ciphertext cq is located on the left half plane of the circle group.

According to the above-described method, that multiplication is not performed after the eleventh Bootstrapping but is performed collectively in the eleventh Bootstrapping, so that the number of times of BlindRotate can be reduced to speed up an operation.

The encryption processing device 1 performs the tenth Bootstrapping by a test vector $T_p(X)$ created from Table p[b] and obtains the TLWE ciphertext cp that has p corresponding to the reciprocal of the divisor b as its plaintext.

The encryption processing device 1 performs the twelfth Bootstrapping by a test vector $T_r(X)$ created from Table r[b] and obtains the TLWE ciphertext cr that has the error adjustment value r as its plaintext.

As a result, Expression 5 can be expressed as z=m(a, p, q+r+1).

From $$m(a, p, q+r) = \left\lfloor \frac{a \times p + q + r + 1}{t} \right\rfloor,$$

it is possible to calculate $$\left\lfloor \frac{a \times p + q + r + 1}{t} \right\rfloor,$$

and to obtain the quotient z.

The encryption processing device 1 performs multiplication of the TLWE ciphertext ca and the TLWE ciphertext cp in accordance with FIG. 4. The encryption processing device 1 adds the TLWE ciphertext cp, the TLWE ciphertext cr, and 1 to the ciphertext cc' in a homomorphic manner and obtains the ciphertext cu' as the higher bits of the result of the addition. The thus obtained ciphertext is the TLWE ciphertext cz having the division result z as its plaintext. Instead of adding 1, the value in Table r may be increased by one each.

The encryption processing device 1 performs BlindRotate three times in the operation of the ciphertext cz.

The encryption processing device 1 performs BlindRotate seven times in total, and the required time is about 300 ms.

The time required for one division was able to be reduced as compared with that in the first example, although this result is limited to a case where the divisor and the dividend are 4-bit integers.

The method called Tree PBS was also able to evaluate a lookup table (LUT). However, Tree PBS required eight 3-bit (8-word) tables, for example, for performing division between 3-bit ciphertexts. As a result, it was necessary to perform BlindRotate nine times, and one division required 719 ms. Each of the eight tables is looked up with b, and from the result, one table is created as the second stage and looked up with a. It takes time to create the second-stage table and time to look up the nine tables in total.

In the method according to the present embodiment, the required times was able to be largely reduced from the time conventionally required by reducing the number of bits in a table, reducing the number of times of BlindRotate, and performing reciprocal multiplication of the lower bits.

Further, the reminder of division can be acquired from the result of division of the dividend and the divisor. Homomorphic subtraction of subtracting the ciphertext cc' that is the result of multiplication from the ciphertext c is performed, whereby only the lower bits are extracted. When this procedure is written in an expression, the function $$m'(a,b,c)=(c-a \times b) \bmod t$$

can be regarded as being evaluated.

By calculating m'(z, b, a) using the ciphertext cz of the division result z in the first to third examples, the ciphertext ca of the dividend a, and the ciphertext cb of the divisor b, the remainder can be obtained.

The encryption processing device 1 performs multiplication of the TLWE ciphertext cz and the TLWE ciphertext cb and subtracts the ciphertext cc' that is the result of this multiplication from the TLWE ciphertext ca in a homomorphic manner, thereby obtaining the lower bits of the subtraction result as the ciphertext of the remainder, in accordance with FIG. 4.

Figure 14A:
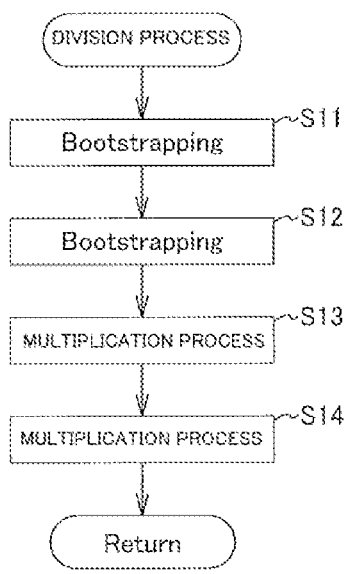
FIGS. 14A, 14B, and 14C are flowcharts for explaining a division process.
Figure 14B:
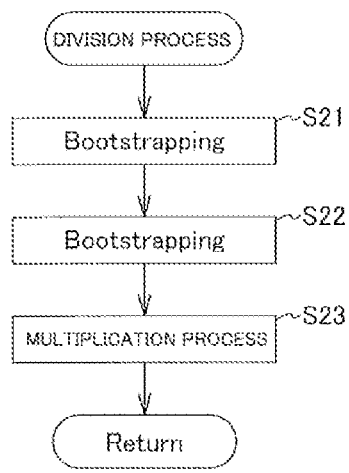
Figure 14C:
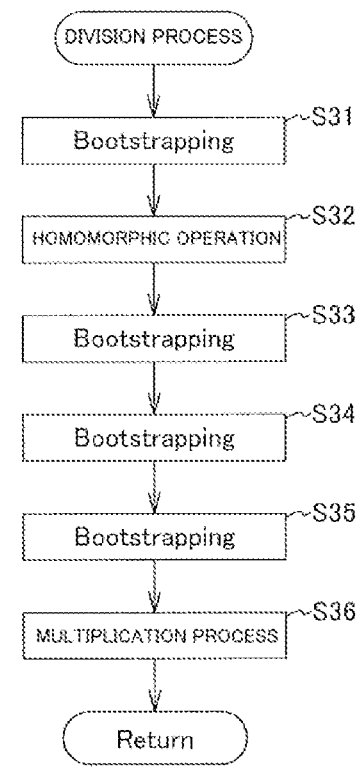

FIGS. 14A to 14C are flowcharts for explaining a division process in the present embodiment.

FIG. 14A is a flowchart for explaining a division process according to the first example.

The encryption processing device 1 performs the first Bootstrapping for the TLWE ciphertext cb that is a divisor at Step S11 to obtain the TLWE ciphertext cf of the reciprocal of the divisor.

The encryption processing device 1 performs the second Bootstrapping for the TLWE ciphertext cb of the divisor at Step S12 to obtain the ciphertext cg of an error adjustment value.

The encryption processing device 1 performs multiplication of the TLWE ciphertext ca of a dividend and the TLWE ciphertext cg at Step S13 to obtain the TLWE ciphertext ch of an error.

The encryption processing device 1 performs multiplication between the TLWE ciphertext ca and the TLWE ciphertext cf (round down the lower bits) at Step S14 to obtain a result of division.

FIG. 14B is a flowchart for explaining a division process according to the second example.

The encryption processing device 1 performs the seventh Bootstrapping for the TLWE ciphertext cb of a divisor at Step S21 to obtain the TLWE ciphertext cs of the reciprocal of the divisor.

The encryption processing device 1 performs the eighth Bootstrapping at Step S22 to obtain the TLWE ciphertext cw of an error adjustment value.

The encryption processing device 1 performs multiplication of the TLWE ciphertext ca and the ciphertext cs of the reciprocal of the divisor obtained at Step S21 to obtain a division result at Step S23.

FIG. 14C is a flowchart for explaining a division process according to the third example.

The encryption processing device 1 performs the ninth Bootstrapping for the TLWE ciphertext ca of a dividend at Step S31 to obtain the TLWE ciphertext ca".

The encryption processing device 1 performs a homomorphic operation of the TLWE ciphertext cb of a divisor and the TLWE ciphertext ca" at Step S32 to obtain the TLWE ciphertext cb'. In the homomorphic operation, the TLWE ciphertext ca" is multiplied by a scalar (by 8), the TLWE ciphertext cb is added to the result of that multiplication in a homomorphic manner, and then 4 is subtracted.

The encryption processing device 1 performs the tenth Bootstrapping for the TLWE ciphertext cb' at Step S33 to obtain the TLWE ciphertext cp.

The encryption processing device 1 performs the eleventh Bootstrapping for the TLWE ciphertext cb at Step S34 to obtain the TLWE ciphertext cq.

The encryption processing device 1 performs the twelfth Bootstrapping for the TLWE ciphertext cb at Step S35 to obtain the TLWE ciphertext cr.

The encryption processing device 1 performs a multiplication process of the TLWE ciphertext ca and the TLWE ciphertext cp at Step S36 to obtain a result of division.

Figure 15:
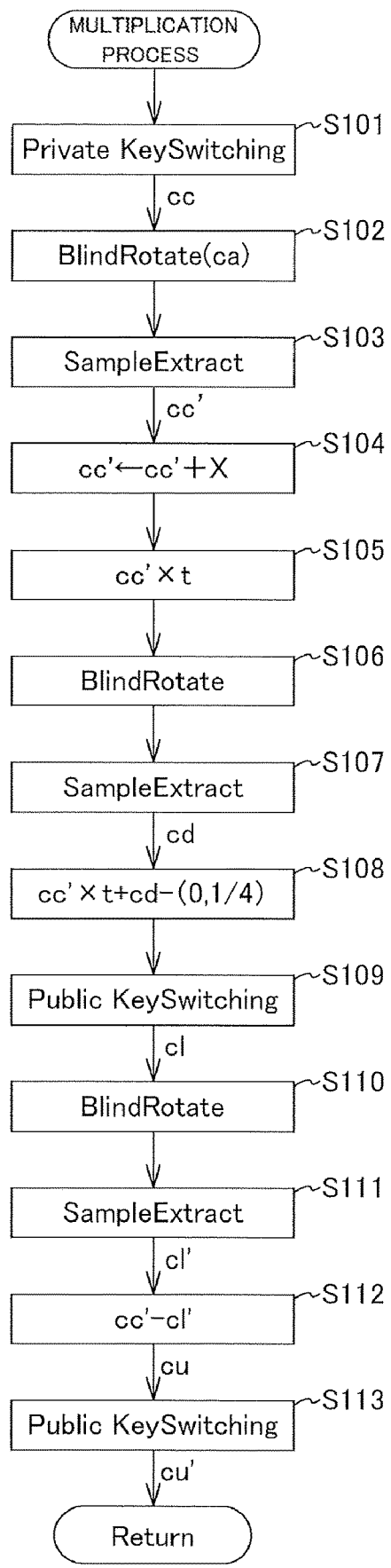
FIG. 15 is a flowchart for explaining a multiplication process.

FIG. 15 is a flowchart for explaining a multiplication process.

The encryption processing device 1 performs Private Key Switching for the TLWE ciphertext cB of a multiplier at Step S101 to obtain the TRLWE ciphertext cc.

The encryption processing device 1 performs BlindRotate using the TLWE ciphertext ca for the TRLWE ciphertext cc at Step S102 and performs SampleExtract at Step S103, thereby obtaining the ciphertext cc'.

The encryption processing device 1 adds a ciphertext Y serving as an error adjustment value to the ciphertext cc' in a homomorphic manner to obtain a new ciphertext cc' at Step S104, and then calculates cc'×t at Step S105.

The encryption processing device 1 performs, for the ciphertext cc' multiplied by t, BlindRotate at Step S106 and SampleExtract at Step S107 to obtain the ciphertext cd.

The encryption processing device 1 calculates cc'×t+cd(0, 1/4) at Step S108 and Public Key Switching at Step S109 to obtain the ciphertext cu'.

With the above processes, the lower bits (three bits) of the result of multiplication between Integer-wise type TLWE ciphertexts can be obtained.

Further, the encryption processing device 1 performs BlindRotate using the TLWE ciphertext ca for the ciphertext c1 at Step S110 and SampleExtract at Step S111 to obtain the ciphertext c1'.

The encryption processing device 1 calculates cc'−c1' at Step S112 to obtain the ciphertext cu.

The encryption processing device 1 performs Public Key Switching for the ciphertext cu at Step S113 to obtain the ciphertext cu'.

With the above processes, the higher bits of the result of multiplication between Integer-wise type TLWE ciphertexts can be obtained.

Figure 16A:
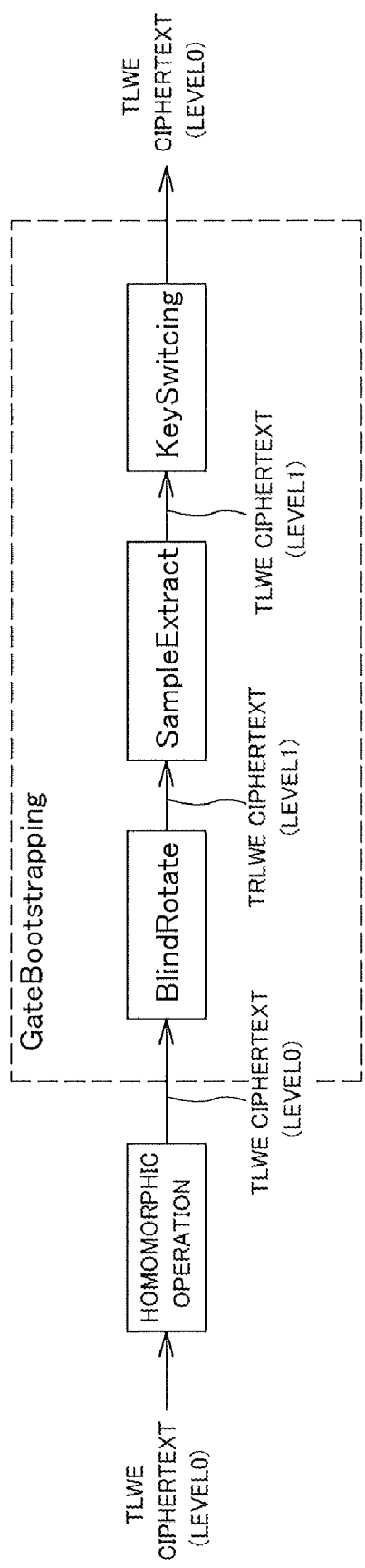
FIGS. 16A and 16B are diagrams illustrating ciphertexts input to and output from Gate Bootstrapping in the present embodiment.
Figure 16B:
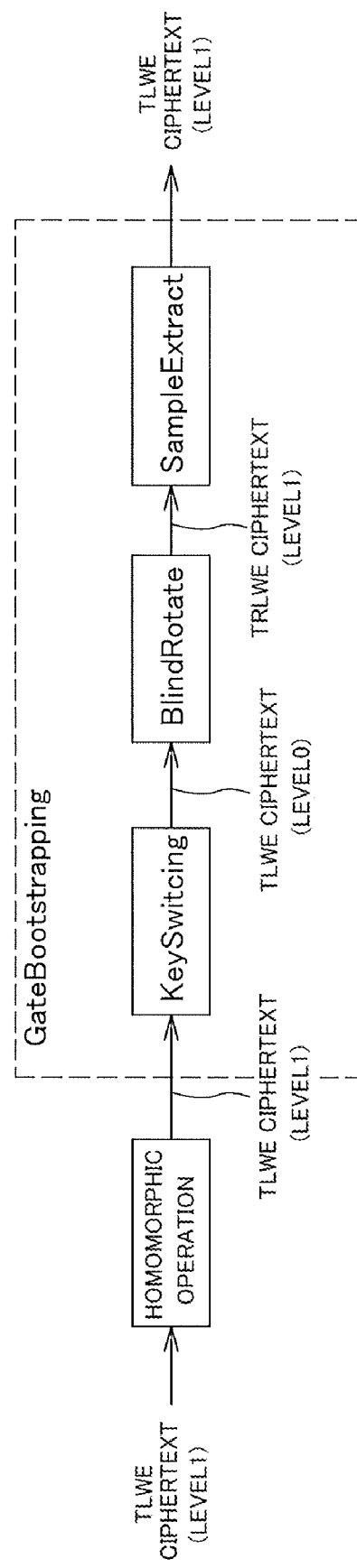

FIGS. 16A and 16B are diagrams illustrating ciphertexts input to and output from Gate Bootstrapping in the present embodiment.

In the above descriptions, Gate Bootstrapping, in particular, the first Bootstrapping has been described as being performed in the order of BlindRotate, SampleExtract, and Public Key Switching, as illustrated in FIG. 16A.

The order is not limited thereto. In Gate Bootstrapping, Public Key Switching can be performed first, and thereafter BlindRotate and SampleExtract can be performed, as illustrated in FIG. 16B.

As for TLWE ciphertexts, there is a concept of levels depending on security strengths.

In Gate Bootstrapping in FIG. 16A, TLWE ciphertexts as input and output are at LEVEL0. A TLWE ciphertext obtained by performing BlindRotate for a LEVEL0 TLWE ciphertext and performing SampleExtract for a TRLWE ciphertext as the output of BlindRotate is at LEVEL1. However, as a result of Public Key Switching, a LEVEL0 TLWE ciphertext is output.

Meanwhile, in the method illustrated in FIG. 16B, TLWE ciphertexts as input and output of the Gate Bootstrapping are set to LEVEL1, and Public Key Switching is performed first to lower the level to LEVEL0. In this state, BlindRotate is performed. When SampleExtract is then performed for the TRLWE ciphertext as the output of BlindRotate, a LEVEL1 TLWE ciphertext is output.

The LEVEL0 ciphertext is formed by an N-th order vector [a] of elements on the circle group $\{T\}$ encrypted with an N-th order private key [s]. Meanwhile, the LEVEL1 ciphertext obtained as a result of SampleExtract is formed by an n-th order vector [a'] of elements on the circle group $\{T\}$ encrypted with an n-th order private key [s'].

In the LEVEL0 ciphertext, the number of coefficients (the order of the vector) contributing to difficulty of the LWE problem is smaller than that in the LEVEL1 ciphertext, and thus the amount of calculation of homomorphic addition is smaller as compared with the LEVEL1 ciphertext.

On the other hand, the LEVEL0 ciphertext has a problem that the security strength tends to decrease when an allowable error added to a plaintext is made small. This is because in LWE encryption, the security is ensured by the error added to the plaintext.

In TLWE encryption, calculation (decipher) is more difficult as the error added to the plaintext is larger and the number of coefficients (the order of the vector) is larger.

In other words, regarding TLWE encryption, the smaller the error added to the plaintext is and the smaller the number of coefficients (the order of the vector) is, the easier calculation (decipher) is.

In particular, in TFHE applied to the Integer-wise type, it is necessary to divide the range from 0 to 1 of the circle group $\{T\}$ more finely as the value of the plaintext (integer) stored in a TLWE ciphertext becomes larger. Thus, an error needs to be made smaller also because of a problem of an error in decryption which will be described later. In this case, the security strength tends to decrease, as described above. Therefore, in order to make the error smaller, it is necessary to ensure security by increasing the number of coefficients (the order of the vector) in the ciphertext.

In order to ensure the security of the ciphertext that is easy to calculate (decipher) by reducing the error added to the plaintext, it is desirable to move Public Key Switching to the beginning of Gate Bootstrapping and to use the LEVEL1 ciphertexts, having a large number of coefficients (the order of the vector) and is easy to make an error range smaller, as input and output of Gate Bootstrapping. Then, after conversion to LEVEL0 is performed at the beginning of Gate Bootstrapping, the level is not returned to LEVEL0 at the end. By not returning the level to the LEVEL0, it is possible to safely perform calculation of the TLWE ciphertext also in the next stage.

The time required for BlindRotate is proportional to the number of coefficients (the order of the vector) of the input TLWE ciphertext, because the number of times of CMux is the same as the order. Therefore, when the LEVEL1 ciphertext is input, the time required for BlindRotate becomes longer in proportion to the number of coefficients (the order of the vector) than when the LEVEL0 ciphertext is input.

Even if a LEVEL1 ciphertext is input to Gate Bootstrapping in order to ensure the security of the ciphertext, it is possible to avoid increase in the required time by performing BlindRotate using the LEVEL0 TLWE ciphertext obtained by conversion by Public Key Switching as input.

Further, making an error to be added to a plaintext smaller has a problem of an error in decryption in addition to the above-described problem of security strength.

As described above, in TFHE applied to Integer-wise type, the range from 0 to 1 associated with the circle group {T} is divided into t. When the value of t is made larger and the circle group is more finely divided, the integer value that can be recorded in a TLWE ciphertext can be further increased. The maximum value that can be stored is determined by the number t of divisions of the circle group. However, since it is necessary to make the error range smaller in order to store a large value, there are a problem that the security strength decreases and a problem that the decryption error rate increases.

In LWE homomorphic encryption including TFHE, errors added to plaintexts are distributed in the normal distribution, and it is not possible to strictly set an "error range".

In principle, it is only possible to concentrate more errors in a specified range, although there is no change in the concentration around 0.

When the error is out of the set range, the corresponding plaintext is interpreted as another plaintext, and thus an unexpected calculation result may be obtained.

The calculation itself does not become impossible, but only a different result is obtained. How much probability that a different calculation result is obtained is acceptable depends on the application to which homomorphic encryption is applied.

It is necessary to set a system parameter to make the overlap of error ranges fall within certain values in order to best balance three objectives of suppressing the probability of occurrence of an error in calculation, speeding up calculation by reducing the number of times of BlindRotate, and maintaining high security.

The error may be set so as to satisfy a particularly important condition in accordance with a system or a device to which the present embodiment is applied.

APPLICATION EXAMPLE

The processes performed by the encryption processing device 1 can be applied as follows.

For example, there is considered a case in which it is desired to aggregate, from a database in which fields and/or records are encrypted by TLWE encryption, records each having a specific field within a certain range (for example, a case in which it is desired to obtain an average annual income of 30 to 39 years old).

In this case, the encryption processing device 1 is a database sever that manages the encrypted database, receives a query encrypted by TLWE encryption from a terminal device connected thereto via a network or the like, and returns a response to the query which is encrypted by TLWE encryption to the terminal device.

In an encrypted database, division is required, for example, when it is desired to obtain an average value.

The encryption processing device 1 performs a comparison operation that compares all records in the encrypted database with the query by using the functions of the first operation unit 12, the second operation unit 13, the third operation unit 14, the first Bootstrapping unit 15, the second Bootstrapping unit 16, the third Bootstrapping unit 17, the fourth Bootstrapping unit 18, and the key exchange unit 38.

The comparison operation is to perform subtraction between a ciphertext of a record and a ciphertext of a query, and the positive and negative of the subtraction result is equivalent to the comparison operation.

The encryption processing device 1 can further perform an aggregate operation for records that match the query in the comparison operation.

In the aggregate operation, the encryption processing device 1 adds the records that match the query in the comparison operation to calculate a total, and further obtains an average value by using division.

As described above, in processing of a query with respect to an encrypted database, it is necessary to perform four arithmetic operations such as addition, subtraction, multiplication, and division, and comparison (comparison is equivalent to positive or negative of a subtraction result) between integers constituting ciphertexts.

In particular, when a weighted average value is obtained, division is required, for example, when a value of multiplication between a record and a weighting factor is divided by the number of records. In a case of using Bit-wise type ciphertexts, it is considered that a full adder operation is frequently used for this processing. If the bit length of an integer to be handled becomes large, the number of required full adders also increases. The four arithmetic operations are homomorphic four arithmetic operations with respect to encrypted numerical values that are regarded as ciphertexts of respective bits when a permutation using an input ciphertext is expressed in binary.

The encryption processing device 1 of the present embodiment does not perform four arithmetic operations for Bit-wise type ciphertexts on a bit-by-bit basis using a full adder, but performs four arithmetic operations and comparison between Integer-wise type ciphertexts each having an integer as a plaintext. Therefore, a query execution time can be significantly reduced.

The four arithmetic operations and comparison between integers are used not only for aggregation in the database described above, but also in various data processing using ciphertexts frequently.

Other examples include fuzzy authentication and fuzzy search.

Fuzzy authentication is biometric authentication using, for example, biometric authentication data, and it is an absolute condition that biometric authentication data that does not change over a lifetime is encrypted and concealed.

In fuzzy authentication, authentication is performed based on a correspondence between biometric authentication data presented as an authentication request and biometric authentication data registered in a database. It is determined whether both the data match each other with a threshold, instead of determining whether both the data completely match each other.

Fuzzy search is an ambiguous search method in which data close to a query is presented as a search result from a database even if the query and a record do not completely match.

In fuzzy authentication and fuzzy search, the encrypted database and the query are compared with each other, as in the comparison operation and the aggregate operation in the encrypted database described above. At this time, it is necessary to perform the comparison operation using the data encrypted by homomorphic encryption. Further, an average needs to be obtained for normalizing sensor values or evaluation values. When the average is obtained, division of dividing an added value of the sensor values or the evaluation values by the number of values is performed.

In addition, the Euclidean distance is often used for comparison in fuzzy authentication or fuzzy search. When the Euclidean distance is calculated, calculation of a square is required. In bit-wise type homomorphic encryption, O ($N^2$) full adders must be caused to operate with respect to the bit length of data when multiplication is performed. Even in a comparison operation by simple subtraction, it is necessary to operate O (N) full adders.

The encryption processing device 1 of the present embodiment does not perform four arithmetic operations for Bit-wise type ciphertexts on a bit-by-bit basis using a full adder, but performs four arithmetic operations and comparison between Integer-wise type ciphertexts each having an integer as a plaintext. Thus, the processing time required for fuzzy authentication or fuzzy search can be largely reduced.

Figure 17:
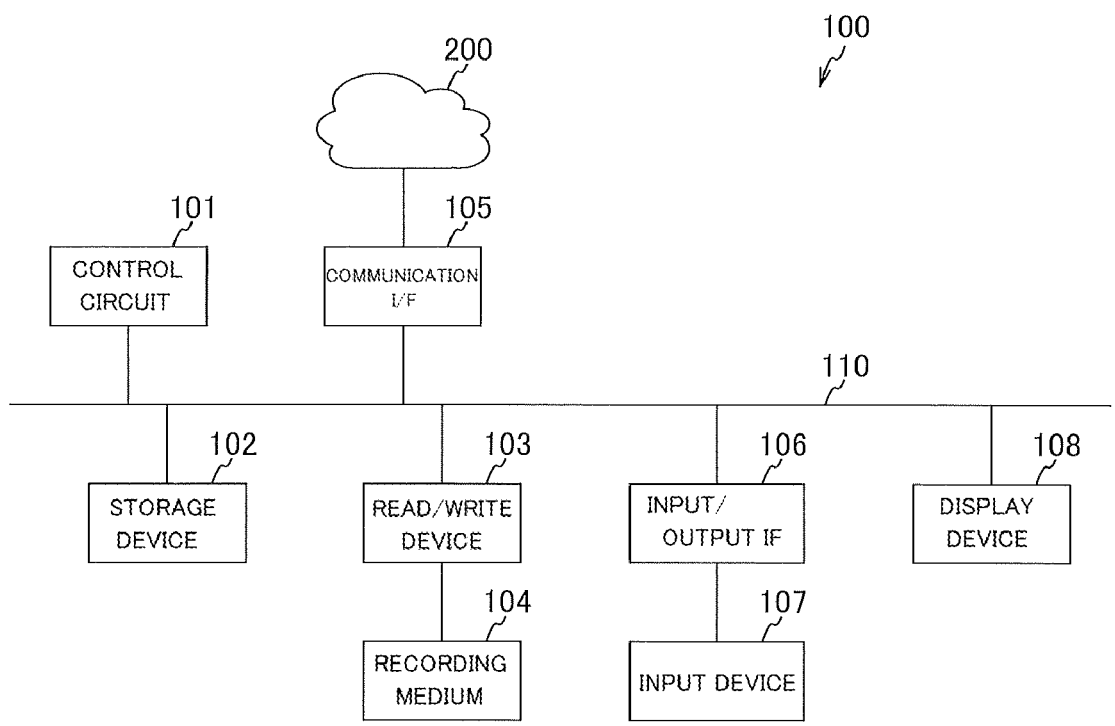
FIG. 17 is a block diagram illustrating an example of a computer device.

FIG. 17 is a block diagram illustrating an example of a computer device.

A configuration of a computer device 100 is described with reference to FIG. 17.

The computer device 100 is, for example, an encryption processing device that processes various types of information. The computer device 100 includes a control circuit 101, a storage device 102, a read/write device 103, a recording medium 104, a communication interface 105, an input/output interface 106, an input device 107, and a display device 108. The communication interface 105 is connected to a network 200. The respective constituent elements are mutually connected to one another via a bus 110.

The encryption processing device 1 can be configured by selecting a part of or all elements from the constituent elements incorporated in the computer device 100 as appropriate.

The control circuit 101 controls the entire computer device 100. For example, the control circuit 101 is a processor such as a Central Processing Unit (CPU), a Field Programmable Gate Array (FPGA), an Application Specific Integrated Circuit (ASIC), and a Programmable Logic Device (PLD). The control circuit 101 functions as the controller 10 in FIG. 1, for example.

The storage device 102 stores various types of data therein. For example, the storage device 102 is a memory such as a Read Only Memory (ROM) and a Random Access Memory (RAM), a Hard Disk (HD), and a Solid State Drive (SSD). The storage device 102 may store therein an information processing program that causes the control circuit 101 to function as the controller 10 in FIG. 1. The storage device 102 functions as the storage unit 20 in FIG. 1, for example.

The encryption processing device 1 loads a program stored in the storage device 102 into a RAM when performing information processing.

The encryption processing device 1 (the first example) executes the program loaded to the RAM by the control circuit 101, thereby performing processing that includes at least one of a receiving process, the first Bootstrapping process, the second Bootstrapping process, a multiplication process (the first operation process, the second operation process, the third operation process, the fourth operation process, the third Bootstrapping process, the fourth Bootstrapping process, the fifth Bootstrapping process, and a key exchange process), and an output process.

The encryption processing device 1 (the second example) executes the program loaded to the RAM by the control circuit 101, thereby performing processing that includes at least one of a receiving process, the seventh Bootstrapping process, the eighth Bootstrapping process, a multiplication process (the first operation process, the second operation process, the third operation process, the fourth operation process, the third Bootstrapping process, the fourth Bootstrapping process, the fifth Bootstrapping process, and a key exchange process), and an output process.

The encryption processing device 1 (the third example) executes the program loaded to the RAM by the control circuit 101, thereby performing processing that includes at least one of a receiving process, the fifth operation process, the ninth Bootstrapping process, the tenth Bootstrapping process, the eleventh Bootstrapping process, the twelfth Bootstrapping process, a multiplication process (the first operation process, the second operation process, the third operation process, the fourth operation process, the third Bootstrapping process, the fourth Bootstrapping process, the fifth Bootstrapping process, and a key exchange process), and an output process.

The program may be stored in a storage device included in a server on the network 200, as long as the control circuit 101 can access that program via the communication interface 105.

The read/write device 103 is controlled by the control circuit 101, and reads data in the removable recording medium 104 and writes data to the removable recording medium 104.

The recording medium 104 stores various types of data therein. The recording medium 104 stores information processing program therein, for example. For example, the recording medium 104 is a nonvolatile memory (a non-transitory computer-readable recording medium) such as a Secure Digital (SD) memory card, a Floppy Disk (FD), a Compact Disc (CD), a Digital Versatile Disk (DVD), a Blu-ray (registered trademark) Disk (BD), and a flash memory.

The communication interface 105 connects the computer device 100 and another device to each other via the network 200 in a communicable manner. The communication interface 105 functions as the communication unit 25 in FIG. 1, for example.

The input/output interface 106 is, for example, an interface that can be connected to various types of input devices in a removable manner. Examples of the input device 107 connected to the input/output interface 106 include a keyboard and a mouse. The input/output interface 106 connects each of the various types of input devices connected thereto and the computer device 100 to each other in a communicable manner. The input/output interface 106 outputs a signal input from each of the various types of input devices connected thereto to the control circuit 101 via the bus 110.

The input/output interface 106 also outputs a signal output from the control circuit 101 to an input/output device via the bus 110. The input/output interface 106 functions as the input unit 26 in FIG. 1, for example.

The display device 108 displays various types of information. The display device 108 is, for example, a CRT (Cathode Ray Tube), an LCD (Liquid Crystal Display), a PDP (Plasma Display Panel), and an OELD (Organic Electroluminescence Display). The network 200 is, for example, a LAN, wireless communication, a P2P network, or the Internet and communicably connects the computer device 100 to other devices.

The present embodiment is not limited to the embodiment described above and various configurations or embodiments can be applied within a scope not departing from the gist of the present embodiment.

All examples and condition statements aided herein are intended for educational purposes to help the reader understand the concepts contributed by the inventor to further the invention and the art, and are to be construed as not limited to such specifically aided examples and conditions, and the construction of such examples is not relevant to depicting the superiority of the invention. While embodiments of the invention have been described in detail, it is to be understood that various changes, substitutions, and modifications may be made herein without departing from the spirit and scope of the invention.

What is claimed is:

1. An encryption processing device that processes a ciphertext, the ciphertext being a fully homomorphic ciphertext that has a value obtained by adding an error with a predetermined variance to a predetermined value, as a plaintext associated with an integer and that enables a predetermined operation between integers without decryption, and the predetermined operation being division of a first ciphertext as a dividend and a second ciphertext as a divisor, the device comprising a processor which executes a process including:
   calculating a third ciphertext corresponding to a reciprocal of the divisor by using a first polynomial for the second ciphertext; and
   calculating a fourth ciphertext by multiplying the first ciphertext by the third ciphertext, the fourth ciphertext corresponding to a result of dividing the first ciphertext by the second ciphertext.

2. The encryption processing device according to claim 1, wherein the process executed by the processor further includes:
   calculating a fifth ciphertext corresponding to a value that adjusts an error by the multiplication by using a second polynomial for the second ciphertext, and
   when the fourth ciphertext is calculated, outputting an operation result obtained by performing a homomorphic operation of the fifth ciphertext for a ciphertext which is a result of multiplying the first ciphertext by the third ciphertext.

3. The encryption processing device according to claim 2, wherein the process executed by the processor further includes:
   calculating a ciphertext having either of two values in accordance with a value of the dividend by using a third polynomial, and using the second polynomial for a new second ciphertext obtained by multiplying the second ciphertext by the calculated ciphertext.

4. The encryption processing device according to claim 3, wherein the process executed by the processor further includes;
   performing multiplication of the second ciphertext by the ciphertext having either of two values simultaneously with using the second polynomial, by using the second polynomial after predetermined addition is performed for the second ciphertext.

5. The encryption processing device according to claim 1, wherein the first polynomial is created by using a reciprocal of a plaintext of the second ciphertext as the divisor, calculated in advance.

6. The encryption processing device according to claim 1, wherein the process executed by the processor further includes:
   creating a sixth ciphertext having a stepped polynomial as a plaintext based on the third ciphertext, and performing a predetermined operation based on the sixth ciphertext and the first ciphertext as the dividend to perform multiplication of the first ciphertext and the third ciphertext.

7. The encryption processing device according to claim 1, wherein the process executed by the processor further includes:
   performing a process of reducing a number of coefficients before calculating a new ciphertext using a predetermined polynomial for a ciphertext as input; and
   calculating a new ciphertext using the predetermined polynomial for a ciphertext.

8. The encryption processing device according to claim 1, wherein the process executed by the processor further includes:
   performing the predetermined operation to perform a process related to fuzzy authentication or fuzzy search which uses the ciphertext as an input.

9. The encryption processing device according to claim 1, wherein the process executed by the processor further includes;
   performing the predetermined operation to perform a query for an encryption database based on the ciphertext as an input.

10. An encryption processing method of processing a ciphertext executed by a processor, the ciphertext being a fully homomorphic ciphertext that has a value obtained by adding an error with a predetermined variance to a predetermined value, as a plaintext associated with an integer and that enables a predetermined operation between integers without decryption, and the predetermined operation being division of a first ciphertext as a dividend and a second ciphertext as a divisor, the method comprising:
    calculating a third ciphertext corresponding to a reciprocal of the divisor by using a first polynomial for the second ciphertext; and
    calculating a fourth ciphertext by multiplying the first ciphertext by the third ciphertext, the fourth ciphertext corresponding to a result of dividing the first ciphertext by the second ciphertext.

11. A non-transitory computer-readable recording medium storing therein a program for causing a processor to execute an encryption process of processing a ciphertext, the ciphertext being a fully homomorphic ciphertext that has a value obtained by adding an error with a predetermined variance to a predetermined value, as a plaintext associated with an integer and that enables a predetermined operation between integers without decryption, and the predetermined operation being division of a first ciphertext as a dividend and a second ciphertext as a divisor, wherein the encryption process includes calculating a third ciphertext corresponding to a reciprocal of the divisor by using a first polynomial for the second ciphertext, and calculating a fourth ciphertext by multiplying the first ciphertext by the third ciphertext, the fourth ciphertext corresponding to a result of dividing the first ciphertext by the second ciphertext.

* * * * *